March 12, 1963

J. H. LEMELSON 3,081,379

AUTOMATIC MEASUREMENT APPARATUS

Filed Dec. 4, 1956

INVENTOR.
JEROME H. LEMELSON

INVENTOR.
JEROME H. LEMELSON

March 12, 1963 J. H. LEMELSON 3,081,379
AUTOMATIC MEASUREMENT APPARATUS
Filed Dec. 4, 1956 10 Sheets-Sheet 3

INVENTOR.
JEROME H. LEMELSON

INVENTOR.
JEROME H. LEMELSON

March 12, 1963  J. H. LEMELSON  3,081,379
AUTOMATIC MEASUREMENT APPARATUS
Filed Dec. 4, 1956  10 Sheets-Sheet 6

INVENTOR.
JEROME H. LEMELSON

March 12, 1963  J. H. LEMELSON  3,081,379
AUTOMATIC MEASUREMENT APPARATUS
Filed Dec. 4, 1956  10 Sheets-Sheet 8

INVENTOR.
JEROME H. LEMELSON

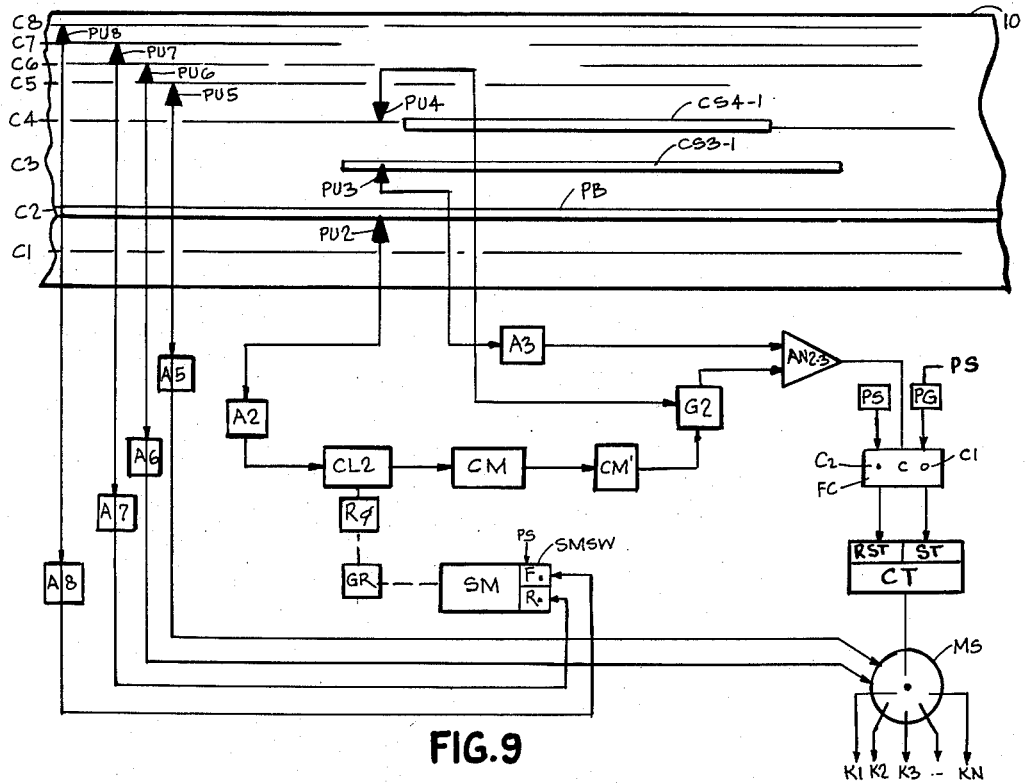
FIG.9
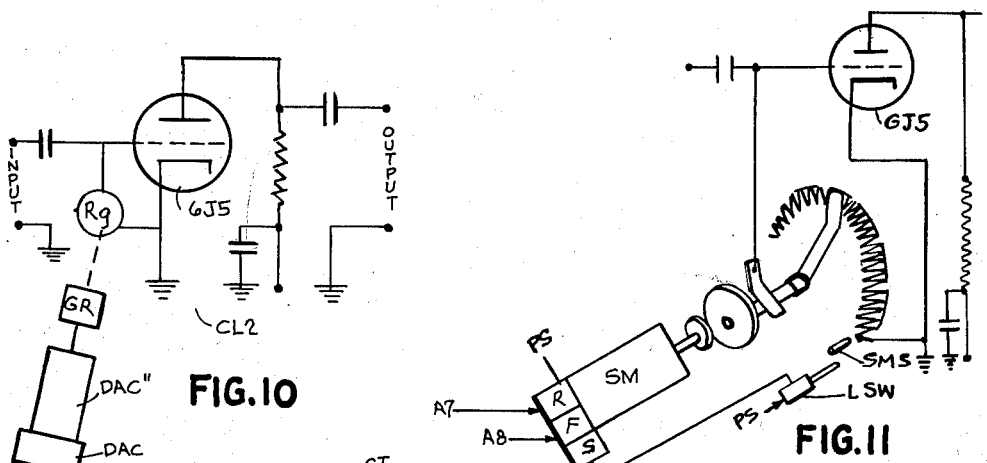
FIG.10
FIG.11
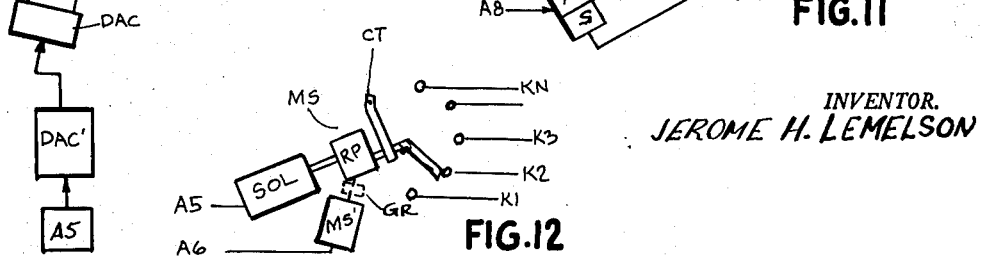
FIG.12
INVENTOR.
JEROME H. LEMELSON March 12, 1963 J. H. LEMELSON 3,081,379
AUTOMATIC MEASUREMENT APPARATUS
Filed Dec. 4, 1956 10 Sheets-Sheet 10

INVENTOR.
JEROME H. LEMELSON

United States Patent Office 3,081,379
Patented Mar. 12, 1963

3,081,379
AUTOMATIC MEASUREMENT APPARATUS
Jerome H. Lemelson, 289 High St., Perth Amboy, N.J.
Filed Dec. 4, 1956, Ser. No. 626,211
17 Claims. (Cl. 178—6.6)

The present invention relates to magnetic recording and particularly to arrangements whereby video picture signals may be used for effecting a multiple of computing, operative, measurement and control functions.

It is known in the art to record a series of picture signals on a moving magnetic tape and for reproducing said signals at essentially the time rate of recording to create a motion picture on a video or television screen for visual observation. My copending patent application Serial Number 688,348, now abandoned, describes means for recording a video signal of a single frame or screen sweep of the video scanning beam of a camera or flying spot scanner which may be reproduced thereafter and used to provide a still image picture on a video monitor screen.

In accordance with one embodiment of the present invention, all or part of a video picture single frame sweep signal is recorded on a magnetic medium whereby a point in said signal which is preferably the start of said frame sweep, is known and is indicated by a sync pulse also recorded on said medium and a second signal thereon is used to effect the reproduction of parts of said video signal. By using such a method of programming video signal recording and reproduction, various automatic operations may be performed on or in coaction with part of said video signal.

Accordingly, it is a primary object of this invention to provide means whereby video picture signals and the like may be used for automatic computing, control and measurement operations.

Another object of this invention is to provide simple and improved means for operating on a video picture signal which is recorded on a magnetic recording medium for investigating and/or changing part of said signal.

Still another object is to provide means whereby a video picture signal may be used to effect automatic quality control by the investigation of part of said signal.

Another object is to provide an automatic means whereby a video picture signal may be used to effect dimensional measurement and investigation of tolerance.

Another object is to provide a means for effecting automatic measurment and quality control functions using two video picture signals, one a standard signal of known characteristic and the other a sample or test signal, whereby all or parts of said signals are investigated and compared by their simultaneous reproduction from a magnetic recording medium on which they are recorded in predetermined relative positions.

Another object is to provide automatic means for reproducing a specific or predetermined part or parts of a video picture signal for computing, measurement or control purposes.

Another object is to provide automatic means for reproducing that part of a video signal derived during the scanning of a specific area of a total image field without the need to control the scanning beam of a video scanning device.

Still another object is to provide means for operating on video picture signals and for modifying or changing specific portions of said signals whereby the altered picture signal may be used to produce a video image or still picture of modified image characteristics.

Another object is to provide means for recording a video picture signal with digital pulse code signals adjacent thereto for effecting the reproduction of said video signal.

Still another object is to provide video scanning and control means for automatically effecting the measurement or inspection of an object for obtaining dimensional or other physical characteristics.

Still another object is to provide apparatus for the automatic inspection by photoelectric or video means of work in process or finished goods without manual attendance thereto.

Another object is to provide new and improved apparatus which may be used to effect various inspection, control and digitizing functions.

Another object is to provide automatic apparatus for measuring an object or surface including means for selectively measuring predetermined parts of said object and for providing information in code form resulting from said measurement which may be utilized by a digital computer.

Another object of this invention is to provide improved means for providing picture information on magnetic recording tape for record keeping and other functions.

The circuits and recording arrangements described above are intended to be merely illustrative. Many different types of circuits could be substituted for each of the component circuits illustrated. Thus, while the present invention has been described by reference to particular embodiments thereof, it will be understood that this is by way of illustration of the principles involved and that those skilled in the art may make many alterations and modifications in the arrangement and mode of operation. Therefore, I contemplate by the appended claims to cover any such modifications as fall within the true spirit and scope of my invention.

The invention will now be described in greater detail with reference to the appended drawings in which.

Figures 1, 2:
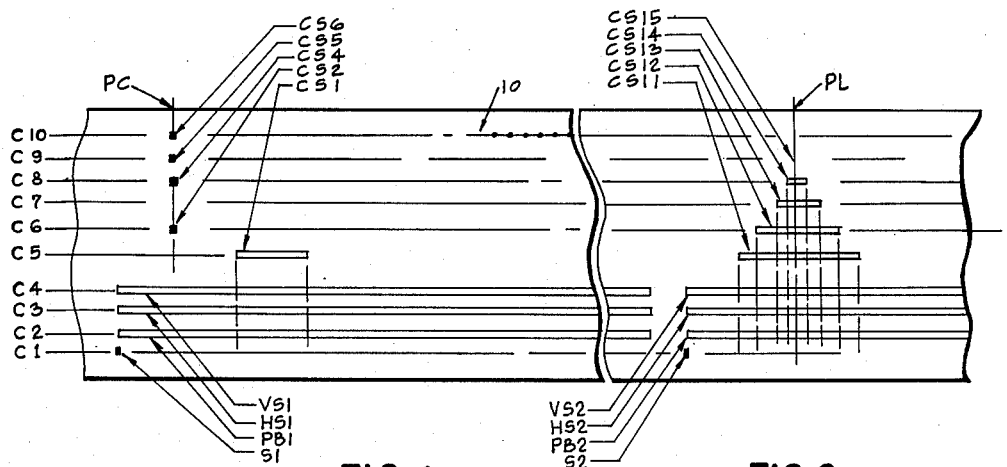
FIG. 1 illustrates a portion of a recording member and an arrangement of picture signals and control or gating signals provided thereon in predetermined relative positions.
Figure 3:
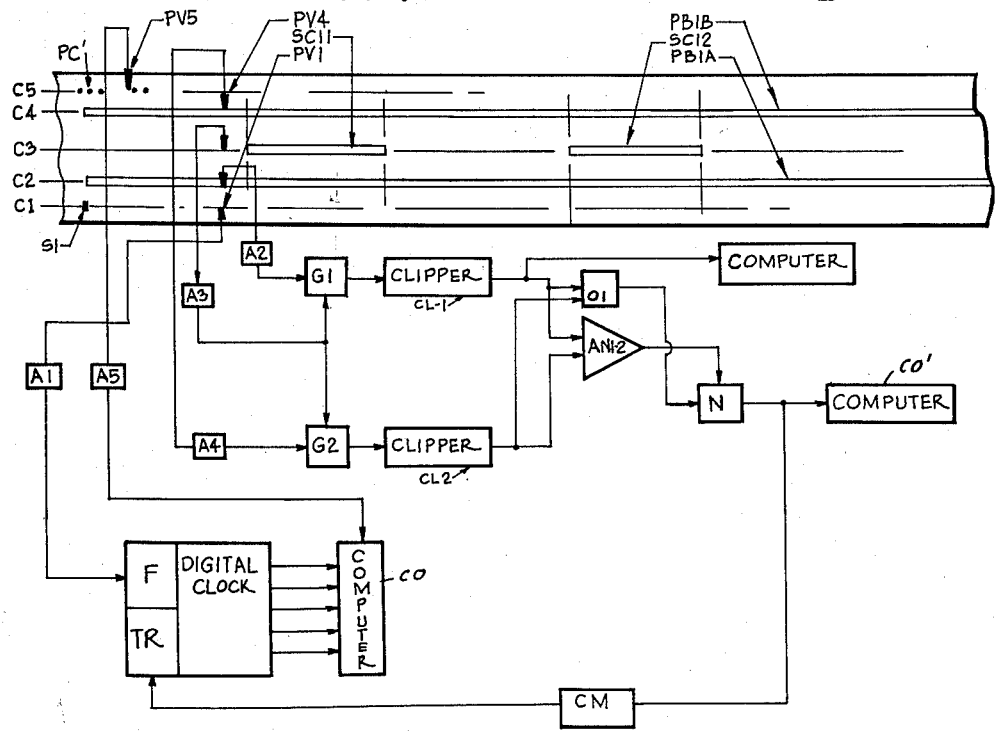
Figure 1A:
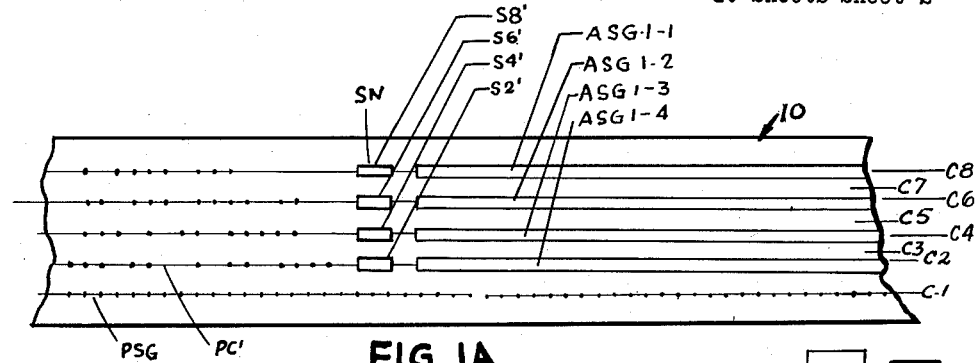
FIG. 1A illustrates a portion of a multi-track recording member having plural picture signals recorded adjacent each other and associated control or gating signals tandemly aligned with said picture signals.
Figure 1B:
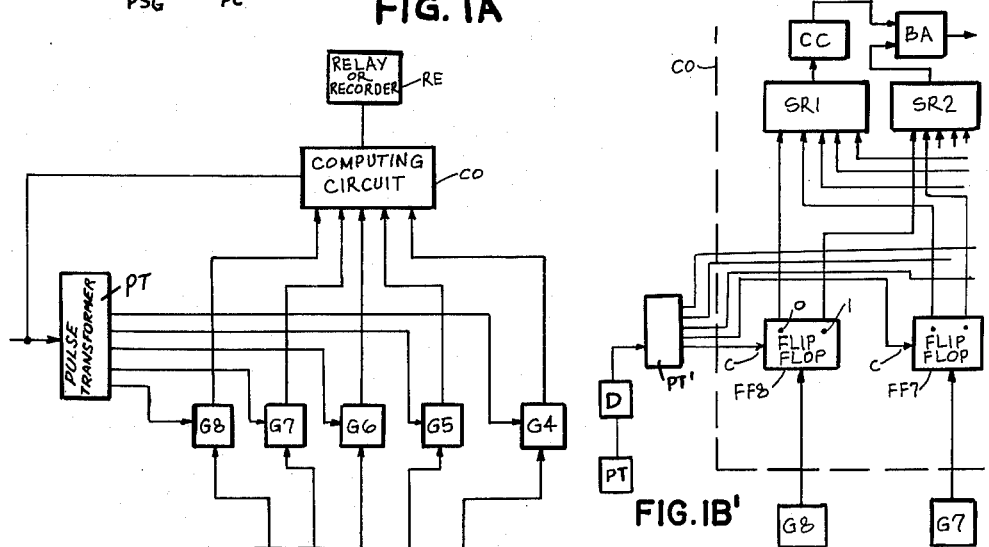
FIG. 1B illustrates a portion of a multi-track recording member containing both picture and code signals recorded on different tracks thereof and also illustrates in block diagram notation, gating and computing circuitry for utilizing reproductions of recordings.
Figure 1B:
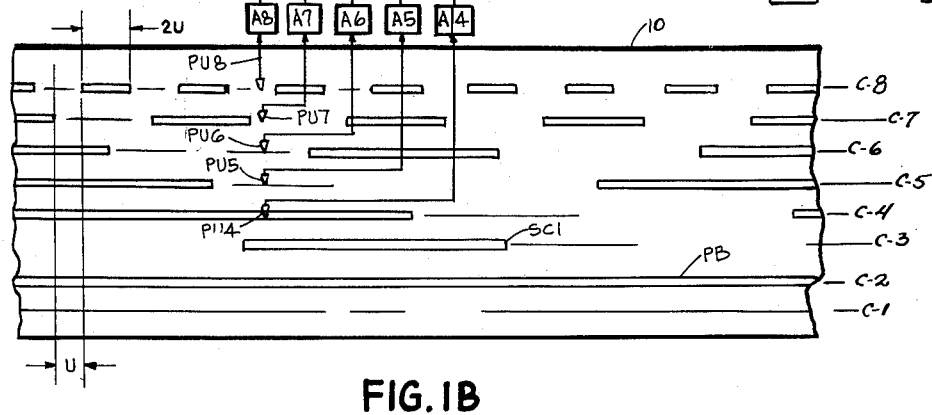
Figure 1C:
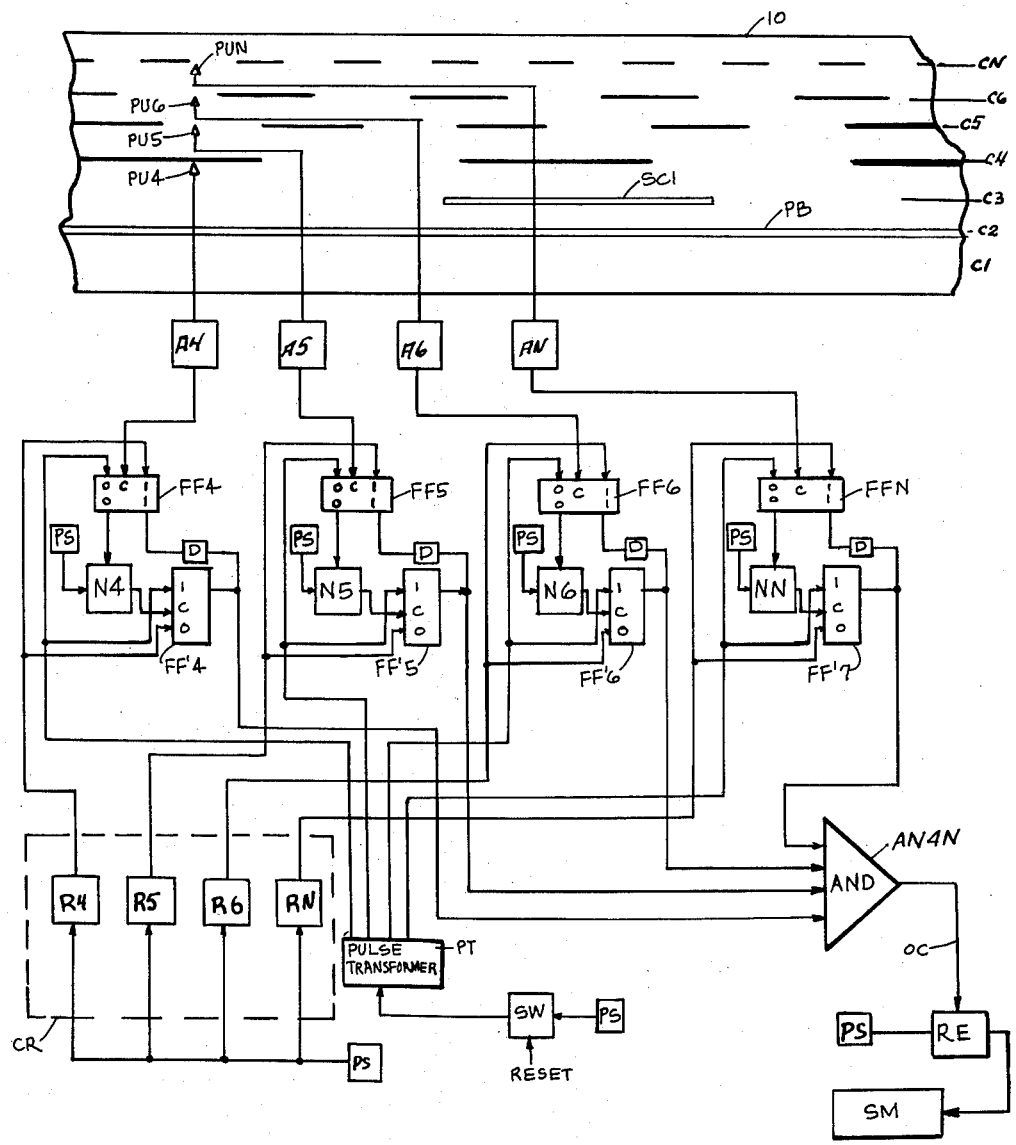
Figure 4:
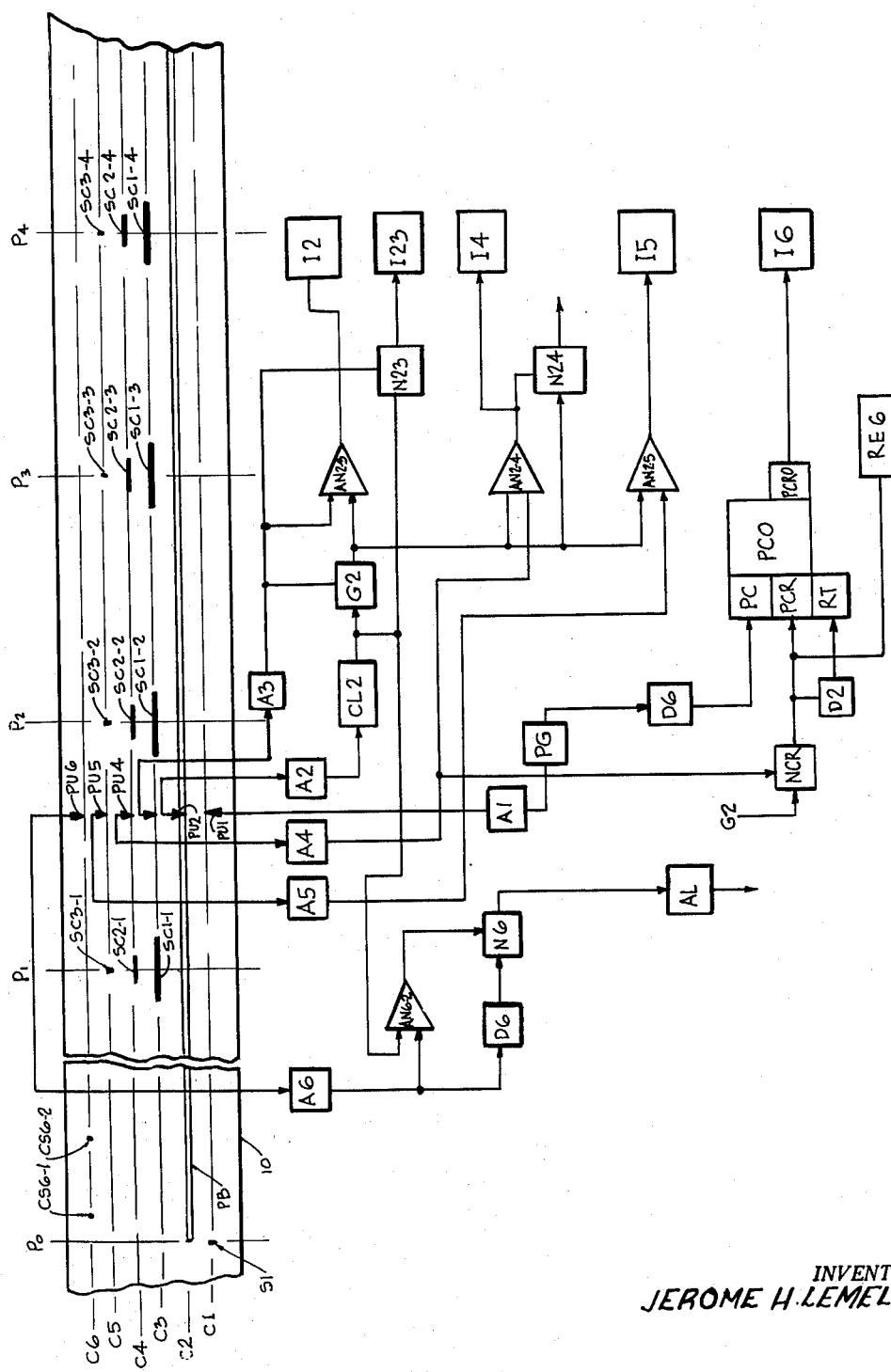
Figure 4:
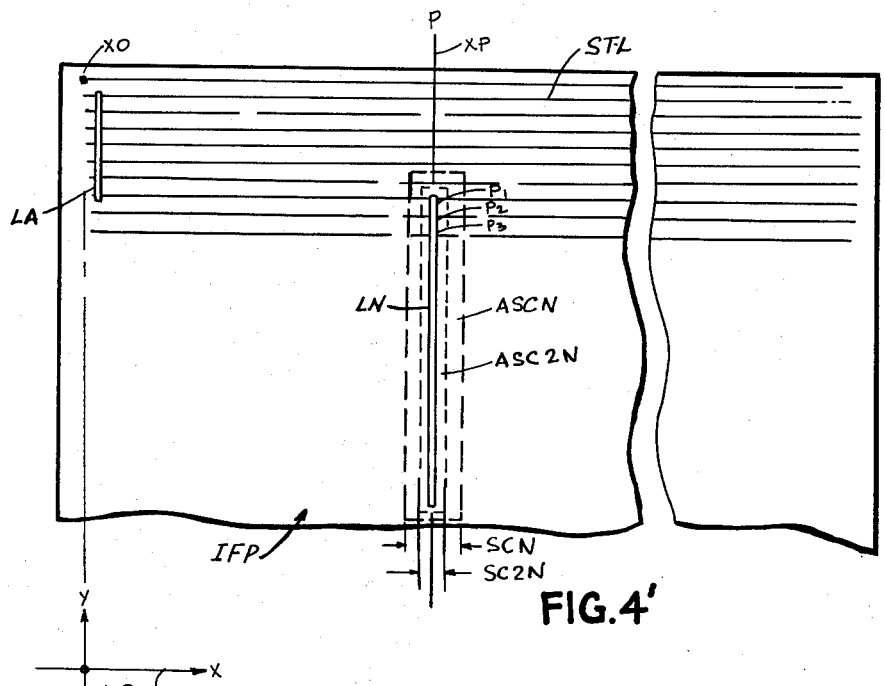
Figure 8:
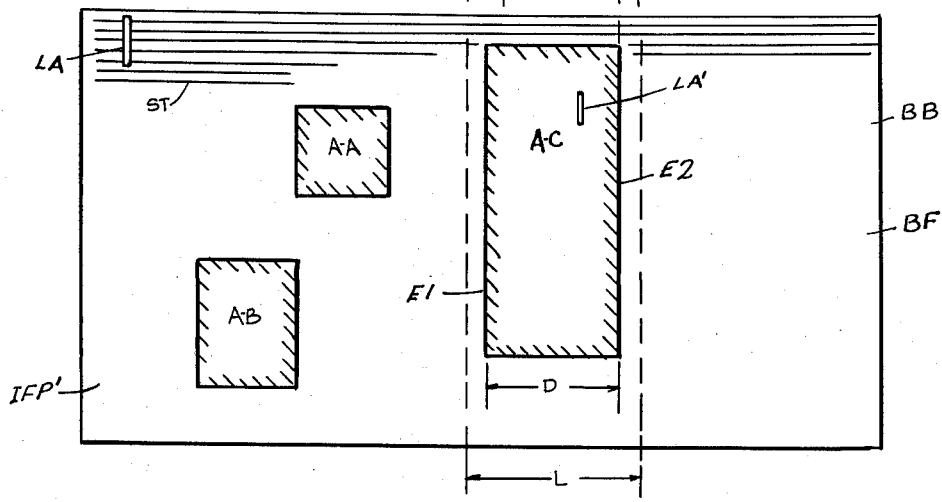
Figure 4A:
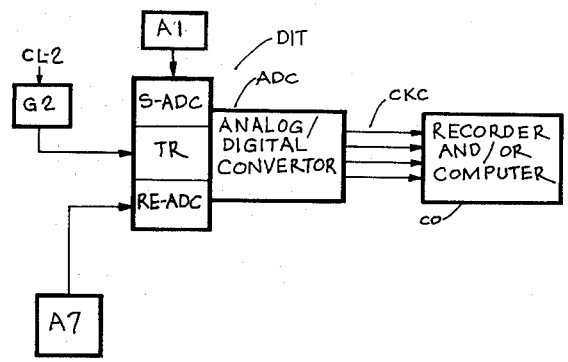
Figure 4B:
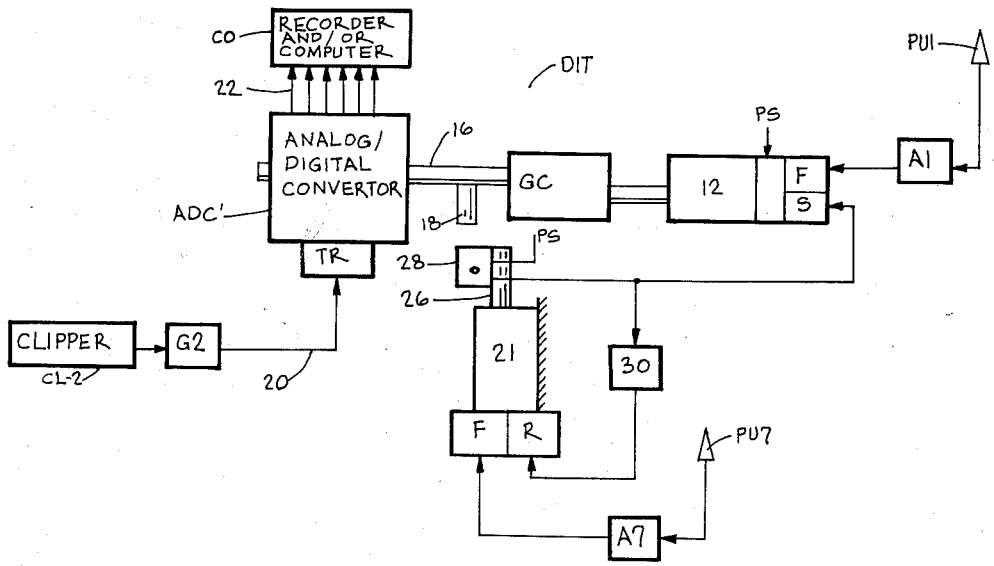
Figure 5:
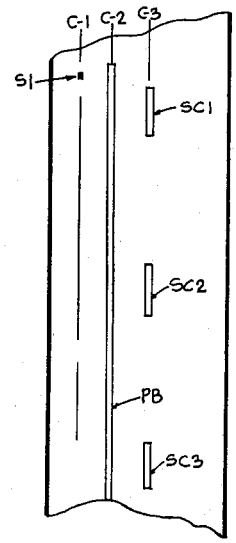
Figure 6:
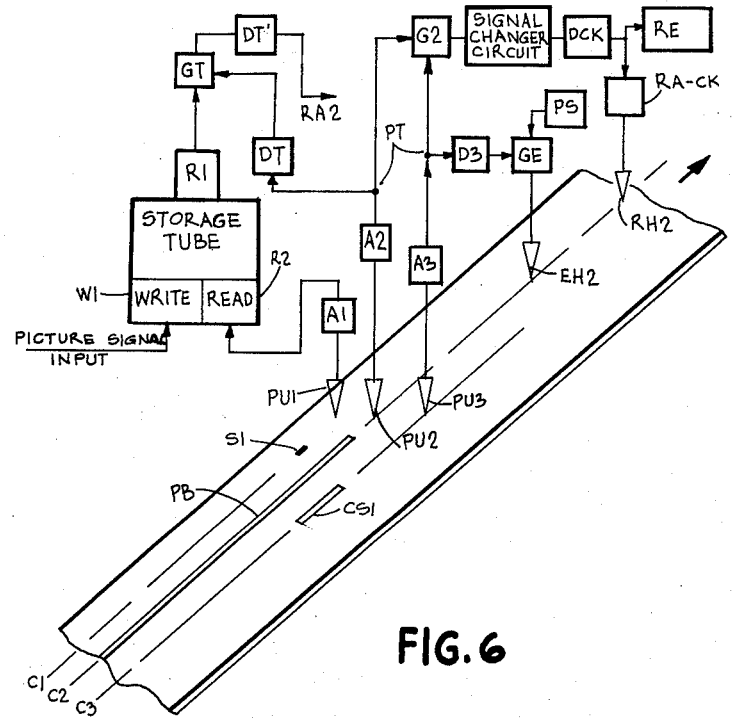
Figure 7:
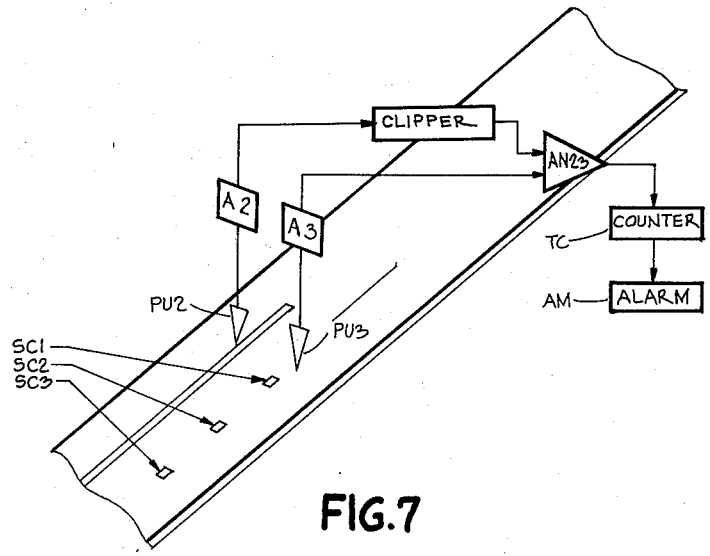
Figure 8:
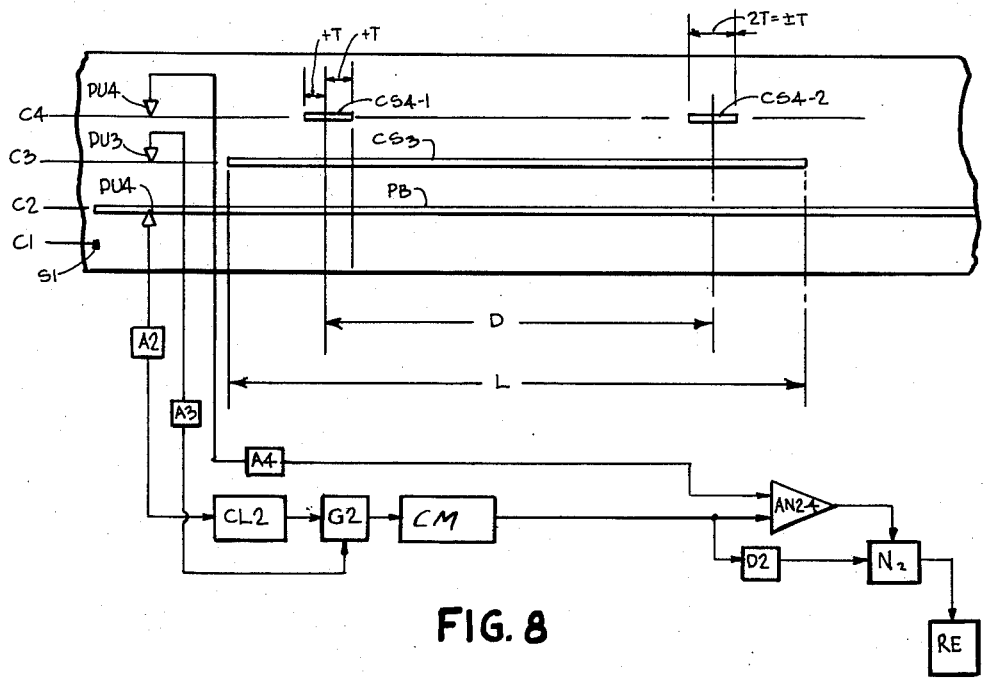
Figure 15:
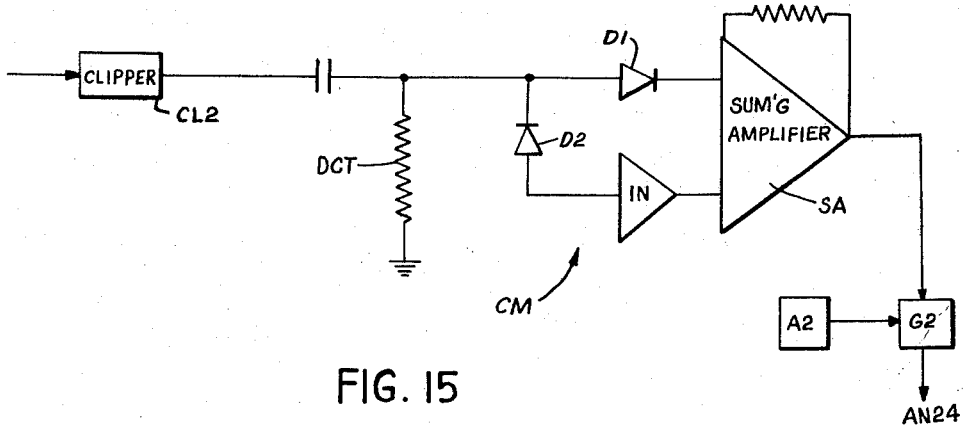
Figure 13:
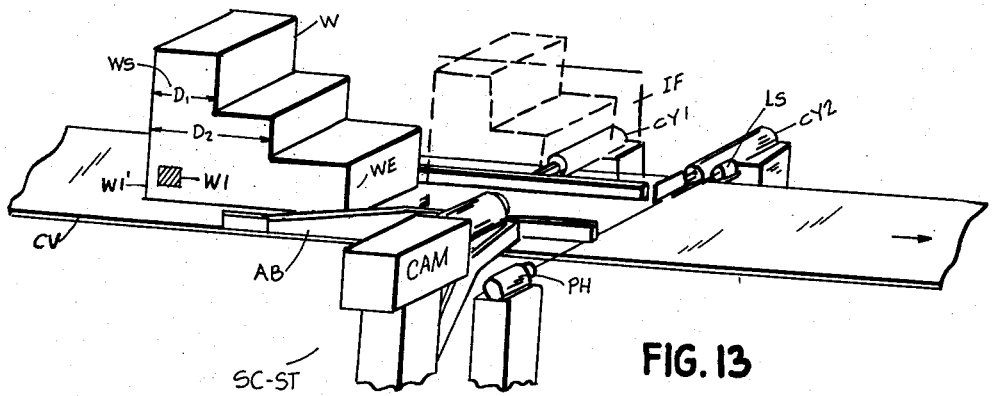
Figure 14:
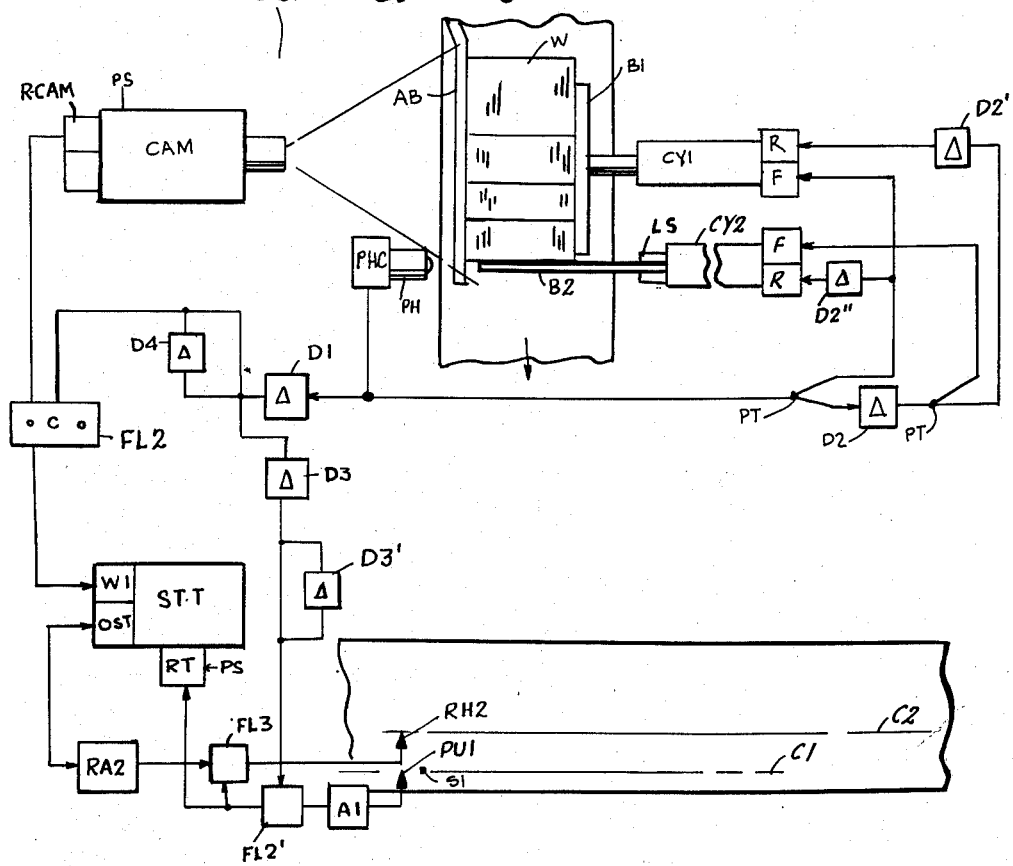

FIG. 1B' is a circuit diagram showing details of part of the computing circuitry of FIG. 1B;

FIG. 1C illustrates a portion of a recording member containing picture signals and control signals and circuitry provided in the output of the reproduction transducers which scan said recording member;

FIG. 2 illustrates a portion of a multi-track recording member having signals of predetermined duration or length recorded thereon in predetermined positions relative to recorded picture signals for indicating, when reproduced simultaneously with said picture signals, dimensional ranges of the physical phenomenon or objects scanned to generate said picture signals;

FIG. 3 illustrates a recording and reproduction arrangement whereby control means are provided for blanking all but predetermined or particular portions of one or more picture signals so that the remaining portion or portions of said picture signals may be analyzed without interference from the other portions;

FIG. 4 illustrates a recording and reproduction arrangement for operating on a picture or analog signal in a manner similar to that illustrated in FIG. 3 to effect one or more dimensional measurements or control functions;

FIG. 4' is a fragmentary view of a scanning field illustrating the physical significance of certain of the signals recorded on the recording member of FIG. 4;

FIG. 4A illustrates a circuit applicable as a replacement for a portion of the circuit of FIG. 4;

FIG. 4B illustrates a digital code generator or clock applicable to the circuitry of FIG. 4 to effect measurement functions;

FIG. 5 illustrates a recording arrangement with predetermined positioned sync and gating signals;

FIG. 6 illustrates the recording arrangement of FIG. 5 and circuit components utilizing the signals provided thereon;

FIG. 7 illustrates a modified form of the recording arrangement and circuit components of FIGS. 5 and 6;

FIG. 8 illustrates a recording arrangement and a reproduction circuit diagram utilizable for effecting automatic dimensional measurement;

FIG. 8' illustrates a scanning field showing physical aspects of the signals recorded in FIG. 8;

FIG. 9 illustrates a recording arrangement and reproduction circuitry therefore applicable for measuring the various dimensions of distances in an image field and providing said measurements as coded signals;

FIG. 10 illustrates a clipping level adjustment means applicable to part of the apparatus of FIG. 9;

FIG. 11 is a more detailed view of a portion of FIG. 10;

FIG. 12 is a more detailed view of a portion of FIG. 9;

FIG. 13 is an isometric view of a scanning station utilized to provide picture signals which are applicable to the recording and measurement arrangements illustrated in the other drawings;

FIG. 14 is a plan view of FIG. 13, which view also illustrates recording and dimensional measuring components; and FIG. 15 illustrates a circuit which may be substituted for the Schmidt cathode coupled multivibrator circuit of FIGS. 8 and 9.

A number of recording, reproduction, scanning and comparison measurement, counting, control and computing functions will be described hereafter together with apparatus which will utilize a video picture signal derived by electron beam or flying spot scanning of an object or image field or a video storage tube surface. For most of the above functions, said picture signal or signals are recorded in a fixed or predetermined position, on a magnetic recording member such as a magnetic tape or drum, relative to one or more controls and/or gating signals which will be denoted by the notations SC or CS. While these control signals are specified as constant amplitude pulse signals of a short or predetermined duration, they may also be of variable amplitude and/or frequency depending upon the type of operation or function controlled thereby.

One technique presented hereafter comprises the scanning and investigation of an image or optical field such as a specific area of a surface of a work piece or assembly or an image field in which a portion thereof contains an object or plurality of objects having an optical characteristic which is discernable from the characteristic of the surrounding field or background by, for example, different color or light reflectivity, which investigation involves the analyzing of a length or lengths of the video picture signal produced when said object or field is scanned by a video camera or flying spot scanner. If automatic scanning or comparison measurement using a change in a portion of a video signal is to be employed for measurement or analysis of the optical characteristics of the field from which the signal was derived, then a requisite for such measurement, if it is to be meaningful, is that the area, object, or other phenomenon in the field being scanned must be at a known distance from the scanning camera optical system or the flying spot scanner so that its scanned area will be to a predetermined scale in the image field. The attitude of the object or plane being scanned must also be fixed or predetermined relative to the axis of the video scanning device. Also, a plane, point or area of said object should be or referenced in position in said field being scanned. The requirement for any automatic measurement is that a base or benchmark be established. Since measurement or comparison is effected in this invention by scanning means, which is utilized to indicate the existence of an area, line or plane in the field being scanned, the above mentioned scale, alignment and positional requisites must exist to a predetermined degree or tolerance in order to attain a predetermined degree of precision in said measurement. It is thus assumed, for those functions described hereafter where dimensional measurement, comparative image analysis or other investigations involving the scanning and analysis of a specific area or areas of the total field, that said object, surface, or area being scanned is prepositioned, aligned and provided at a predetermined scale in the scanning field. For the automatic and rapid investigation of multiple articles or assemblies by this method, a jig, fixture, platform or other form of prepositioning stops may be provided to preposition said articles at a fixed distance and attitude relative to the video scanning device and preferably with at least one surface area or point of said article at a predetermined point, plane or position in space.

The following are physical conditions which may be measured, indicated or compared by means of the automatic measurement apparatus provided hereafter:

(1) Indication of the position of a line, point, border of a specified area, or a specified area in a given image field. This may be provided as a coded signal or series of coded signals which are indicative of said position or positions from a base point or line in said field or at a specfied distance from said field.

(2) Determination if said point, line or area is positioned in a predetermined area or position in said field, and if not within limits, how far said image falls or is positioned away from said predetermined position.

(3) Determination if said point, line or area in said field being scanned falls within a specified distance or region such as a tolerance range, one or either side of a specified position.

(4) Determination in which of several specified regions in an image field being scanned, each of which encompasses a different area either or both sides of a specified position or area in said field, a point, line or area falls. This function pertains to automatic sorting operations.

(5) Determination if a predetermined image exists or does not exist in a specified area of an image field. If so, determination also how much or to what extent said area falls in said specified area. This function pertains to inspection functions to determine if image conditions exist such as surface defects, markings, assemblies, or internal defects whereby X-rays are used to provide the image.

(6) The measurement of the dimension or dimensions of an image in a field by scanning part of said image at a constant scanning rate and timing the scanning from one point in its travel across an image to another.

The various electrical circuits used hereafter for performing the described measurement, comparison and indicating functions are illustrated in block diagram notation for the purposes of simplifying the descriptions and drawings. Unless otherwise noted, the circuits and components illustrated in block notation are standard circuits which are known in the art. The following assumptions are also made regarding the circuitry to simplify drawings and descriptions.

In the diagrams, where junctions are illustrated between two or more circuits which are electrically connected at said junction with a further single circuit, it is assumed that a logical OR circuit is employed at said junction.

Where a single circuit extends from a junction to two or more circuits, it is assumed that either a single input, multi-output transformer is provided at said junction or said output circuits are resistance balanced permitting any input signal to travel over both said outputs.

Wherever circuits which require a power source, such as switching or logical circuits, gates, clipping circuits, multivibrators, servo motors, controls, amplifiers, transducers, are provided, it is assumed that a source of the correct electrical power or potential is provided for said circuits. Power is also assumed to be provided on the correct side of all gates and relays where needed.

Various automatic measurement and comparison scanning techniques are provided hereafter whereby a picture signal, derived from photoelectric or video scanning an image field or part of a field, is recorded on a magnetic recording member such as a magnetic tape along a predetermined length of said tape and in predetermined positions relative to other signals used for gating and control. When reproduced together, said other signals may be used to effect one or more predetermined functions relative to said picture signal. While the method of recording all signals in predetermined relative positions on a recording member and then reproducing and using said signals in one or more manners described hereafter, has a number of advantages including the provision of a record which may be rechecked if necessary or otherwise monitored, in the embodiments provided hereafter it is not necessary to record the video or picture signal on the recording member provided that means are provided for presenting said picture signal in the respective measurement or control circuit at a predetermined time in relation to said other signals.

It is noted that for many of the functions described, particularly those where it is only necessary to measure or compare images, a picture signal may be passed directly from a video storage tube or other photoelectric scanning device to the reproduction amplifier through which the reproduced signal passes. However, functions such as record keeping, may require that the picture signal be recorded, hence recording arrangements are illustrated.

In the various magnetic recording arrangements and apparatus provided hereafter, picture signals are shown recorded on a magnetic recording member which also has other signals recorded thereon in predetermined positional relationship to said picture signals. Said recording member is illustrated as an elongated flexible magnetic tape or the developed surface of a magnetic disc or drum. While not illustrated, it is assumed that known means are provided for driving said tape or drum at constant speed past magnetic reproduction apparatus when constant speed is a requisite for said measurement. For example, when an automatic timing circuit is utilized to effect a measurement between two predetermined points in said picture signal, said timing device and the drive for said tape must be synchronized to start at predetermined times and operate at predetermined rates. If the magnetic recording member is driven at a predetermined constant speed and the timing device operates at a predetermined constant rate and is started at an instant determined by the time of reproduction of one or more signals on said magnetic recording member, then a particular reading or value of the timing device may be converted to a lineal distance or a coordinate in the field which was scanned to produce said picture signal.

*Definition of Terms:*

Components and known circuits provided hereafter bear the following general alphabetical notations in the various drawings. Where a dash (−) follows the letter, it is assumed that a multiplicity of said devices or circuits are provided.

A−: Amplifier, such as a reproduction amplifier for amplifying signals reproduced by an associated magnetic reproduction transducer or pickup head PU.

RA−: Recording amplifier, used to record pulse or video picture signals on a magnetic recording member.

AN−: A logical AND switching circuit which will produce an output signal when, and only when, signals are present at all inputs to said circuit.

CL−: A vacuum tube or semi-conductor clipping circuit, preferably a video clipper operating at a desired clipping level.

CM, CM′−: A Schmidt cathode coupled multi-vibrator circuit, which comprises a cathode coupled multivibrator with an associated signal inverter at the output of the multi-vibrator. This circuit will produce a pulse output when the leading edge of an elongated pulse appears at said circuit and a second pulse output when the trailing edge of said pulse reaches said circuit.

D−: Delay line or time delay relay of required time constant. If a signal such as a video picture signal is to be delayed, D signifies a delay line.

IF, IFF−: A scanning image field where video beam scanning is employed for inspection.

N−: A normally closed, monostable switch or logical NOT switching circuit which will open and break a circuit when a signal is present at its switching input. May be a vacum tube, semi-conductor or electro-mechanical device or any other logical circuits or gates.

OR−: A logical OR switching circuit adapted to pass a signal from any of a multiple of inputs over a single output circuit.

PF−: A flip-flop switch, electro-mechanical, vacuum tube or semi-conductor circuit. A bi-stable switch adapted to: (a) switch an input signal from one of two input circuits to one of two output circuits, (b) switch a signal from a single input circuit over one of two outputs depending on the described application. The flip-flop switch may have two or three switching inputs depending on the application; a complement input C which, when energized, switches a single input from one output to the other and/or two inputs, each of which, when energized, switches the flip-flop to its respective output.

PB:− A picture signal, preferably derived from beam scanning a fixed image field IF. The signal may be amplitude modulated or frequency modulated and may be the output of a conventional television scanning camera, flying spot scanner or the like. It may be a continuous signal or may consist of a multitude of short pulses depending on the type of scanning and signal formation employed.

The PB signal may also be derived from the output of a fixed photo multiplier tube with the image or object being scanned, being moved to provide variations in said signal. For some application, the PB signal may be any analog signal derived from scanning, an analog or digital computer or other means.

PC−: Pulse code number; this may be any type of code (binary digit, decimal, etc.) recorded either longitudinally along a single channel of a magnetic recording member or recorded laterally along a single channel of a magnetic recording member or laterally along a fixed path or line across multiple channels of said recording member, there being code positions where said code line crosses each recording channel which either (a) contains or does not contain a pulse recording or (b) contains a positive pulse recording or a negative pulse recording depending on the design of the digital computing or switching apparatus to which the reproduced code is transmitted. If recorded along a lateral line of the recording member, the code PC may be reproduced at a specific point in the reproduction of one or more picture or analog signals adjacent thereto and may be used to effect a specific switching action when reproduced to affect a specific section or length of the associated picture signal(s).

SW−A−: A limit switch.

SC, CS−: A signal or signals preferably recorded in positions on a magnetic recording member to be reproduced simultaneously with a specific section of another picture or analog signal and used for gating or control purposes.

ST− refers to video storage tube or storage device having writing input W1 for recording a picture signal on the storage element of said tube and an output R1 which, when a second input R2 is pulsed or energized, passes a picture signal derived from the scanning of the read beam of said tube.

CL— refers to a clipping circuit adjusted to clip at a specific clipping level. A diode, triode or other clipper such as used in video clipping.

IF, IFP— refers to an image or object field being scanned to produce a picture signal. The field may be an optical field in a production or test area such as the scanning field or image field in the optical system of a conventional or special television scanning camera. The field may also be the screen of an optical comparator or projection microscope having a video scanning camera or flying spot scanner focused and positioned relative thereto in a predetermined manner. The image or images in said field may be any optical or radiation phenomenon which provides an area or areas therein of different radiation or light characteristic relative to other areas so that, in scanning across said different areas, the resulting picture signal will change sufficiently to permit a measurement or measurements to be made by electrically noting said changes or differences.

FIG. 1 is a plan view of a magnetic recording member 10 such as a magnetic tape or the developed surface of a magnetic recording drum, showing signal arrangements thereon which are basic to this invention. It is noted that the lateral and longitudinal dimensions of the signal recording channels or areas illustrated hereafter are not necessarily to scale or of equal scale, and are provided merely to illustrate the relative positions of the various signals on the recording member so that their coacting functions may be described. It is also noted that in all the figures illustrating relative signal areas, one of several recording and reproduction systems may be provided, whereby, while the total recording pattern may vary, the positions of the various coacting recordings relative to each other will essentially remain the same to permit the same functions to be accomplished in one recording system as the other. For example, if the magnetic recording tape or drum is moved relative to one or more recording heads which remain stationary, then a series of parallel areas or tracks will be traced by said heads as illustrated in FIG. 1. However, if the recording heads are driven in a rotary path and sweep across said recording medium as the latter moves in a fixed path relative to the rotational axis of said heads, then a series of recording areas oblique to the longitudinal axis of the tape will be traced thereon by said heads and will be characterized by the fact that the end of each oblique recording channel area or head sweep will be continued further along the tape as the beginning of a new oblique trace. Thus, any video and control signal recording arrangements illustrated in one figure as provided on recording areas or channels which extend parallel to the longitudinal axis of the recording medium or tape, may also be provided on the oblique, repeating recording areas of others of said drawings such as FIG. 5, if the same relative positioning of said adjacent signals is maintained in said oblique recording.

Illustrated schematically in FIG. 1 as being recorded on multiple side by side recording areas of the member 10 and each on a separate channel thereof in a predetermined position relative to the others, are respectively (*a*) a sync signal S1 on a first channel or track C–1 which indicates and may have been used to effect the precise positioning of (*b*) a picture signal, PB, derived from beam scanning of field, such as a video signal, which may or may not contain the frame blanking signal component, which picture signal is shown recorded on a second channel C–2. Said picture signal PB–1 may be a recording of the signal output of a video scanning device such as a video camera employing a vidicon, iconoscope or other scanning tube or a flying spot scanner. If it is desired to provide a visual display of the PB signal at some time after its reproduction from 10, the duration and character of said PB–1 signal is preferably such that it may be used when reproduced therefrom to modulate the "write" beam of a video picture or storage tube. In my copending application Serial Number 688,348, means are provided for recording and reproducing a still video image by recording the output of a video camera or storage tube equivalent to the signal derived from the video camera scanning read-beam, during a single frame or screen sweep and either recording said signal in an image storage tube or on a moving recording member, and thereafter reproducing it at video frequency and using it to modulate the picture generating write-beam of a video monitor-screen. The PB–1 signal of FIG. 1 if intended to later reproduce a visual image on a monitor screen, is thus preferably an image, single frame video picture signal with the beginning of said signal (i.e. for raster scanning the start of the picture signal may be defined as a predetermined point occurring at or after the frame vertical sync signal appears when the so-called "read" beam starts its frame sweep) starting or positioned adjacent to or in predetermined relation to S1 such that S1 may be used to control the reproduction of said picture signal. In the inter-laced scanning system, each complete sweep of the camera scanning beam is referred to as a "field" sweep and two of such image fields make up an image "frame." As stated, the PB–1 signal preferably has provided therewith the associated frame blanking signal so that it may be used to effect the production of a video image, if necessary, for display purposes. For specific computing or operational functions, it may be desirable to merely compare part of the PB signal with another signal, whereby only part of a single frame signal need necessarily be recorded and the PB blanking component of said signal may be eliminated. It is noted that the S–1 signal may be used as a trigger signal recorded on a predetermined position of 10 and used thereafter to trigger or otherwise effect the recording of the PB–1 signal on a predetermined recording area or channel of member 10. If the PB signal is recorded at random on 10, S–1 may be used as an indicator of the position of the PB signal and of another signal or signals also recorded thereon.

(*c*) A third channel or band recording area C3 parallel to C–1 and C–2, contains the necessary video horizontal line sync signals HS recorded in a predetermined position relative to PB–1 for the correct horizontal deflection and synchronization of the picture and blanking signal PB–1 to effect the production of a video image and (*d*) a fourth channel C–4 also running parallel to the other channels, contains the associated vertical synchronization signal V for vertical line and frame synchronization of the picture signal PB. The latter two signals are optionally provided in the event that it is desired to reproduce for monitoring or other purposes, the PB signal as a picture on a video screen.

One or more additional recording channels or areas, preferably extending in a parallel direction to those described and referred to by the letter notation CS, are provided adjacent to those described and contain one or more operational gating or command signals. Said signals CS–1, CS–2, CS–3 are either pulse or analog signals and are preferably provided in predetermined fixed positions relative to said picture signal on channel C–2 of 10, to be reproduced therewith and are used to modify, gate or operatively coact with said video signal. While the control signal or signals CS may be recorded at any time on medium 10, if their precise position relative to the video signals is an important factor, their recording may be effected or triggered by the synchronizing signal S–1 which indicates the position of the video signals. If precisely positioned relative to S–1, the CS signals will also be precisely positioned relative to the video signal or signals and may be used to effect one or more operative or measurement functions on or in coaction with said PB signal.

Said command signal or signals may be provided in one or more forms. A single pulse, such as CS-1, may be recorded on a single channel of 10 and positioned adjacent a specific length of the video signal or signals. When reproduced therefrom as said medium 10 moves relative to respective reproduction heads, said pulse signal CS-1 may be used, for example, to gate an adjacent similar length of the video signal over an output circuit for scanning, modifying, measuring, clipping or otherwise operating on or cooperating with said video signal. Thus, the position as well as the length of the pulse signal CS-1 will determine what section and length of the video signal will be gated or otherwise operated on. Said other operations controlled by CS-1 may include magnetic erasure, attenuation, amplification or other modifications to said video signal adjacent or behind said pulse signal on channel C5.

While the CS-1 signal may be a constant amplitude signal or pulse of any desired length, it may also be an analog signal of varying amplitude and/or frequency which is utilized to perform a more complex function on a particular section or sections of the video signal.

Illustrated also in FIG. 1 are a series of other command or control signals CS-2 . . . CSN. In FIG. 1, these are provided as a series of laterally aligned bit pulses, each on a different channel and capable of being simultaneously reproduced therefrom by respective magnetic heads, which are preferably aligned and scan a separate track or area referred to be the notations C6 to C10. Said pulses may be in the arrangement of a digital code PC, such as a binary code, and may be used to effect computing and/or switching functions or circuit selection functions such as operative to (a) affect a specific section or length of the video signal, (b) select a specific section or sections of said video signal for reproduction, (c) adjust or otherwise affect one or more electrical components or circuits in the output of the reproduction head or heads of the video signal or (d) select one of a multiple number of circuits through which part or parts of said video signal may be gated for measurement, inspection or scanning functions to be performed thereon.

While the CS2, CS3, CS4 . . . CSN signals illustrated in FIG. 1 are shown aligned laterally across the medium or tape 10 for simultaneous reproduction by aligned magnetic heads, they may be provided in any positional arrangement which will be determined by the positioning of the magnetic reproduction heads and the required function of said signals. While said signals CS2 . . . CSN in FIG. 1 may be formed as a pulse chain by providing the necessary delay lines or elements in the output circuits of the respective reproduction heads, a pulse chain for computing and/or control or switching purposes may be provided on a single track adjacent the video signal in the form of the appropriate tandem pulse signals or multiple pulse chains may be provided thereon, preferably sufficiently in advance of the video signal of a section of the video signal which it is to affect or gate, to permit a switching, computing or shaft positioning action to take place prior to the reproduction of the desired section of said video signal. The position of said recorded signal or signals on 10, will also be a function of the relative positions of the various reproduction heads.

Also illustrated in FIG. 1 is a code or bit number PC' shown as series of tandem pulses on the channel C10 and having the binary value 1110101. The code PC' is provided as a series recording to illustrate that such a means of recording numerical information may be used with an adjacent analog or picture signal to be reproduced prior to, during or after the reproduction of said picture signal for effecting computing and/or control operations to be performed on or in coaction with the reproduction of said picture or analog signal, or in relation to at least part of said signal. If the series code PC' is utilized for computing and control purposes adjacent a picture signal PB, then still another channel (not shown) is preferably provided with a series of equispaced, equi-duration pulses recorded thereon at preferably the interval of the pulses of PC' to act as a clock when reproduced simultaneously therefrom thus simplifying digital operations in a switching circuit or computer using said pulses code. Although the recording of the picture signal, PB, and the associated sync signals on the magnetic member 10 has many advantages such as the provision of a permanent record which may be referred to at any time or reproduced by selective means whenever needed and visually monitored by modulation of the picture generating beam of a monitor device, said PB signal need not be recorded provided that said signal may be otherwise generated in a measuring or computing circuit at a predetermined instant relative to the generation of said other illustrated signals.

It is further noted that multiple tandem recorded picture signals may be provided on one or more of the channels of the recording member 10 of FIG. 1 with the associated gating and/or code signals for record keeping and computing purposes.

FIG. 2 shows a second recorded picture signal PB2 which may be selectively reproduced by use of a predetermining counter receiving the position indicating signals on channel C1 and which, upon reaching a preset count, closes a switch between the reproduction transducer reproducing from the channels C2 to C4 when that section of the tape 10 containing the selected picture signal PB is adjacent the reproduction transducer.

The parallel code PC may be placed prior to, or after the reproduction of the associated picture or analog signal PB. If recorded prior to said signal, said code PC may effect a specific switching or adjusting action. During the reproduction of a particular segment of the PB signal, said PC signal may gate or effect an action on a specific length of said PB recording. If placed on 10 in a position to be reproduced after the reproduction of the PB signal, the PC signal may be used for effecting a computation obtainable in digital form from other operations on the associated picture signal or a part or parts of said signal.

It is noted that the recording arrangement of FIG. 1 is subject to modification depending on the switching and logical circuitry operatively connected to the output of the transducing apparatus for measuring and performing operations on the associated picture signal, viz:

I. The laterally aligned pulse code PC which, in FIG. 1, is provided for reproduction prior to the reproduction of a section or length of the associated picture signal, to perform a switching, gating, computing or other functions, may be recorded adjacent a particular point in the picture signal for effecting a specific switching function or other action on or simultaneously occurring with a predetermined length of said picture signal. One such function described hereafter providing said code or signals in relay storage to be subtracted from or added to a numerical code derived from operating on a specific length of the picture signal.

II. The illustrated pulse code PC which is shown recorded for a short duration in FIG. 1, may be recorded on a longer section of 10 and may vary in length from a short pulse such as the shortest signal which may be recorded thereon, to the entire length of the picture signal PB. When the code 10 is reproduced, the output circuits of the associated reproduction heads PU will each either have a signal or no signal present during the period a particular code is reproduced whereby said multiple output circuits define a code pattern or bit number at any instant. If it is desired to have this code present for a specific period of time which may represent such phenomenon as a tolerance range, it will be necessary to record the signals reproduced to provide the PC code recorded on member 10 for a time during which said predetermined condition or change in said picture signal will occur. If said code PC is thus recorded as one or more pulse recordings of prolonged and predetermined duration or length next to a predetermined section of the picture signal whereby said position is such that it will be known that said prolonged code PC will exist in output circuitry for a time duration during which a particular change in amplitude or frequency in the picture signal will occur, then said code will be known to exist when said change occurs and will be available for reproduction therewith for effecting switching or control functions, some of which will be described.

III. A series of parallel code recordings PC may exist in tandem array along 10 in a manner whereby, when the end of one code stops the next begins on the next length of said tape. Thus, every point or length of 10 will have an associated parallel code, such as a binary digital code, which will identify said point or length. If a signal or signals such as an analog signal, video picture signal, or other signal or signals are recorded adjacent said chain of said pulse codes recordings PC, the output circuits of the transducers reproducing said codes will be energized with a predetermined code array during the reproduction of a particular length of an adjacent signal which condition will be indicative of the position of the part of said adjacent signal being reproduced at the time the code is reproduced.

If the PC signals are of a binary or other numerically progressing order, whereby each code array occupies the same length of member 10 as the others and each successive code array is of and each successive code array is of a numerical progressing order (i.e. a binary digital signal order whereby one signal array is a unitary increase over the prior recorded code or the same increment as each successive number from the prior number), then the recording member 10 may be used essentially as a digitizer. If driven at constant speed, 10 may be used as a digital timer or clock whereby a code, existing in the output circuits of the transducers reproducing said recorded code tracks, will be indicative of the time lapse from the start of travel of said member 10 provided that the code recorded the start of the cycle is known. The member 10 may be a closed loop tape or drum running continuously and at constant speed. It may be used as a digital clock by providing a normally open electronic switch or gate in the output of each of the reproduction transducers reproducing from channels C–6 to C–10, the code recording channels and pulsing all said gates simultaneously to effect their closure for a brief period of time at the start of the interval being measured and at the end of said interval. The pulse code passed through said gates when first closed may be held in relay storage and may be added to or subtracted from the pulse code passed therethrough at the end of said interval. The result of subtracting the smaller of said two code numbers from the larger number will be indicative of the time lapse between the two provided that the speed of the recording medium is known and the lengths of the code arrays are also predetermined and similar. If the drive shaft of the recording medium 10 is connected to an analog mechanism, then the recording medium and drive may be used as an analog to digital converter of much greater capacity and duration than the conventional coded disc converter.

FIG. 1A illustrates a recording arrangement of analog and digital or coded pulse signals, which are functionally related to each other. An elongated magnetic recording member 10 is provided having multiple recording channels C1 to CN thereon. The channel C1 has a series of pulse signals recorded as a group or as trains thereon, referred to by the notation PSG and comprising pulse recordings positioned at equi-spaced intervals, which may be reproduced and transmitted to a binary counter or other device for identifying any specific section or length of member 10 as a result of the nature of said particular code. The signals PSG comprise equispaced, short pulse recordings which, when reproduced therefrom and passed to a pulse counter such as a decade counter, will indicate any position on said member 10 by the existing value of said counter. On the even channels C2, C4, C6, etc. are provided signal recordings including one or more pulse codes PC such as digital codes, followed by one or more analog signals ASG1 which may be the aforementioned picture signals PB derived by scanning a fixed path in a field. The odd channels C3, C5, C7, etc. may contain other information in pulse or code form such as a signal S1–3, for indicating the position of the start of the associated analog signal such as ASG1–3 indicated by S1–3. The signal S1– may also be used as a switching signal and may be positioned at any predetermined position along the respective channel, for switching the output of the reproduction transducer reproducing a particular part or all of the associated analog signal. The said output may be switched thereby for example, from an input to a digital computer mechanism adapted to receive the associated PC codes to the input of an analog device for receiving the ASG signal reproduced thereafter. The switching signal on the odd channels may also be incorporated and positioned on the even channels between said digital code signals and analog signal such as the illustrated SWS– signals of FIG. 1A.

The analog recording or recordings ASG1–1, ASG2–1, ASG3–1 . . . may be recorded in one of several forms. Said signals may comprise picture signals of different but related phenomena such as derived from the scanning of one or more surfaces of a work member from different angles, two or more signals derived from scanning a standard field and field to be compared therewith, or the simultaneous output of one or more analog recording devices or instruments which are all functioning simultaneously to measure for example, simultaneously changing variables of a process or test. The digital signals preceding each analog signal or signals on each recording channel may be used to preset one or more measuring circuits in a manner to be described, to select a particular length of the analog signal for reproduction, to gate said signal or predetermined sections of said signal as indicated by said code signal, over one or more of a multiple of circuits.

An application of the recording arrangement of FIG. 1A is in the field of machine tool or process control. For example, the analog signals ASG may have each been obtained from the output of a synchro or selsyn generator which is operatively coupled to the shaft of a motor driving a part of a machine. The significance of providing a recording of the type illustrated in FIG. 1A whereby one or more command analog signals on one or more channels of the recording member 10 are preceded by one or more pulse codes PC is that the pulse codes may be used for effecting broad control of the tool driving motor whereas the analog signal there-following may be used to effect a finer control or microposition. Also, while the pulse code on a specific channel or 10 may be used to effect a stepped or intermittent control of the motor driving the tool, the analog signal may be used to effect continuous control of said motor speed and position. Numerous machine tool and materials handling applications exist where the combined digital-analog recording means of FIG. 1A is applicable to advantage. The digital signals may also be used to preset measuring devices and perform other switching functions in coaction with the operation controlled by the analog signals, which functions are not conveniently derived from said analog signal per se. As a further note, the digital codes PC may be used to control the direction and speed for the motor driving the recording member 10 in a predetermined manner. For example, it may be required, in the cycle of operation of the device controlled by analog signal associated therewith, to repeat the control effected by a limited duration analog signal. The digital or pulse code preceding the analog signal may be used to preset a recycling timer or may be held in relay storage and used to control the future motion of the tape or recording member 10 so that the analog signal associated therewith is repeated thereafter or parts of said signal are repeated in a predetermined manner. Pulse recordings S2' to S8' are provided on the even channels between the groups of serially recorded pulse bit codes PC' and the analog or picture signals ASG–. The recordings SN' are preferably several times the length of the pulses comprising the PC' recordings so that they may be used to actuate a relay, responsive only to the longer signal, to switch the output from the respective reproduction transducer from a digital control device to an analog device or circuit prior to the appearance of the reproduced ASG signal. It is noted that the odd channels C3 to CN may contain a parallel pulse code for effecting an operation at a specific point or points in the reproduction of one or more of the analog signals.

FIG. 1B shows multiple recordings on a magnetic recording tape or drum 10, driven at constant speed past multiple magnetic reproduction heads PU. The heads PU-1 to PU-8 reproduce the signals recorded on the respective channels C-1 to C-8. On channel C1 is recorded a sync signal, such as S1 of FIG. 1, for indicating the position of the start of a picture signal such as a video picture signal PB recorded on channel C2. PB may also be any analog signal on which a measurement or operation is to be made. On channel C-3, one or more gating signals CS is recorded for switching a selected length or lengths of the reproduced adjacent PB signal to one or more measurement or clipping circuits. The channels C-4 to C-8 contain multiple pulse recordings arranged in a multiple code or binary scale order such that the heads PU-4 to PU-8 will, at any particular instant while reproducing from said channels, be energized in a specific code order. That is, at any instant, the parallel outputs of said transducers will be energized in a signal array equivalent to a code. The code scale recorded in FIG. 1B is a so-called progressive code with the number zero at the point X1 and the number 32 at X2. A so-called natural binary code recording may also be used as may any code means which will provide a different code or signal array during each unit length or increment U in the tape or drum 10. It is noted that on channel C-8, the pulse signals which are equispaced have a length of 2U or twice the unit length. If the reproduction heads are aligned, as shown, laterally across the member 10, the code existing in their output circuits will depend on which unit length of the recording member said heads are reproducing from at the particular instant. If the member 10 is a closed loop tape or drum and is driven at constant speed relative to said heads PU, then the recordings on channels C-4 to C-8 may be used for timing or clocking purposes or may measure the distance between any two points or changes in the associated PB signal. Illustrated in FIG. 1B are means for automatically determining as a numerical or binary code, the time between any two instantaneous or short duration occurrence. By applying the proper constant or conversion factor to the result, the distance between any two points in the associated picture signal PB and/or the distance between any two points in the image field scanned to produce said signal may be obtained. The combination of the recording member 10, a constant speed drive therefor, the reproduction apparatus and the illustrated circuitry may be used for performing any automatic timing function in which a rapid readout in pulse code form of a time interval between two pulses passed thereto, is desired. The time interval may be any two instances in a timing or measurement cycle of any event whereby means are provided at each instance to produce a pulse of short duration. The apparatus of FIG. 1B may also be used to provide a binary or other pulse code for effecting computational or control functions at various instances in a measurement cycle whereby each instance is characterized by an associated pulse signal. The running code may also be recorded on additional channels of 10.

The output of each of the magnetic reproduction heads PU4 to PU8 is passed to a respective reproduction amplifier, A4 to A8, and thence to the input of a respective normally open monostable gate or switch G4 to G8. The output of each gate is passed to a computer or computing mechanism CO, one form of which will be described and is illustrated in FIG. 1B'. Device CO may also be an automatic recorder. The outputs of the reproduction amplifiers A4 to A8 are only passed to computer CO when the switching inputs to said gates G4 to G8 are energized. Simultaneous energization of all gates is effected to provide a code output indicative that the heads are reproducing from a particular unit length U of 10 by passing a pulse to the input of a multiple output pulse transformer PT, each output of which is connected to a switching input of one of the five normally open monostable switches G-4 to G-8. The gates G4 to G8 are electron tube or semi-conductor devices capable of switching in the megacycle range. Thus, any condition occurring in the signal PB during the interval defined by reproduction of the SC signal or signals may be indicated as a code. If the code occurring on channels C4 to C8 is of a numerically progressing order, then the distance or time between the appearance at the input of PT of two pulses may be indicated by subtracting one code so generated from the other.

If the recording member 10 of FIG. 1B having the code scale recordings illustrated on channels C4 to CN, is provided as a closed loop magnetic tape, it may be used as a component of an analog to digital converted of greater versatility than the conventional coded disc type of converter. Assuming that the tape 10 is driven by the conventional capstan-depressor drive and there is no slippage in the driving means, then the shaft of the capstan or a shaft coupled thereto may be digitized, that is, any degree of rotation of said shaft may be indicated as a numerical code or number by providing a pulse at the input to PT at any instant in the rotation of said shaft. ince the code reproduced from 10 will be a function of the rotation of the capstan shaft, a coded number may thus be obtained for any degree of rotation of said shaft. It is noted that an elongated flexible magnetic tape with the code recordings as illustrated in FIG. 1B offers a coding surface of considerably greater length than the conventional coded disc and, as such, the code may extend as a greater numerical value than on the conventional disc converter surface, thus eliminating counting circuitry and providing a considerably higher numerical value in code form than on the surface of the disc. If the recordings on channels C1 to C3 comprise multiple picture signals or information in the form of bit recordings such as binary code, the recording of a progressing numerical code as in FIG. 1B on said adjacent channels C4 to CN may be used for a number of purposes. Said code may be used for the selective reproduction of any specific adjacent recording such as a bit number or a specific length of PB signal, or the reproduction of one of a multiple of said picture signals for transmission to further control or computing apparatus. Said code may also be used to identify a particular section of said tape for recording a selected signal or bit information. These functions may be effected accurately without the use of a counter counting drive shaft rotations or short pulse recordings and has an advantage over the latter techniques in that each point in the length of 10 is identified by an associated code, whereas counting means are subject to errors if a pulse should be accidentally erased.

If the device of FIG. 1B is used as an automatic interval timer, recording member 10 is driven at constant speed and means are provided in the computing circuit CO for computing the time lapse between two occurrences by subtracting the code occurring at the reproduction heads at the start of the interval to be timed from the code appearing thereat at the end of said interval. The difference will be proportional to the actual time it takes for said codes to pass said reproduction heads. A means for obtaining said difference automatically is illustrated in FIG. 1B' which shows part of the circuit. If the code on C4 to CN is a binary code, subtraction may be effected by a method known as complement addition, which consists of forming the complement of a number in a complementing circuit (CC) and adding this complement to the second number. The result is the difference between the two numbers. In FIG. 1B', the circuitry for effecting this operation is illustrated in part and comprises one single input dual-output bistable switch or flip-flop FF– in the output of each gate G–. The switches FF8 and FF7 which are part of the chain of said switches, are each shown with a complement input which, when pulsed, switches the output of said switch from the existing condition to the other of its switching conditions. Said switches FF– preferably also have a reset input which when pulsed, switches the input to the other of said two states in which it has been placed, or if in said reset state, maintains said reset condition. Assuming that the reset condition of each flip-flop is the illustrated "0" or left hand output and that all flip-flops are in this condition prior to the appearance of the first point in the timed interval, then any pulses of the coded number passed through the gates G4 to GN will pass through said "0" outputs of said flip-flops. The "0" output of each flip-flop is thus connected to a respective input of a first shift register SR–1 which converts the parallel bit code passed through the gates G4 to GN to a series code which is passed to the complementing circuit CC. From the complementing circuit CC, the complement of the number is passed to one input of a binary adder BA. The second coded number which is obtained at the end of said measuring cycle when a pulse appears at the input to the pulse transformer PT, is passed through the flip-flops FF4 to FF8 to a second shift register R2 from which it is passed as a series code to the other input of the binary adder BA. The result, which is transmitted from the adder as a code, is the difference between the two numbers and is proportional to the time between the receipt of the two pulses at the input of PT. Switching of all flip-flops to their output conditions "1" is effected by passing a reproduction of the first pulse passed to PT through a delay line or time delay relay D and then to the input of a multi-output pulse transformer PT'. Each output of PT' is connected to a respective complement input "C" of a respective flip-flop to switch said bi-stable switch to its other output condition. The next signals to pass through the flip-flops are thus passed over the "1" outputs to the shift register SR2. The duration of the delay D will depend on the switching times of the gates G– and FF– as well as the shortest time intervals to be measured. The pulses to PT, as will be described hereafter, may be derived from such a phenomenon as a specified change in the associated recorded PB signal. The technique may be used to measure distances in the image field scanned to produce the picture signal PB as described hereafter. If the flip-flops and circuits CC, BA and SR2 are eliminated, the resulting outputs of SR1 or of the gates G– may be recorded as indications of the coordinate positions of specified lines or areas in the field scanned to produce the picture signal PB. For the circuit of FIG. 1B' to function, the code scale on channels C–4 to C8 will be a binary code.

The input to the pulse transformer PT of FIGS. 1B and 1B' may be transmitted from such circuit arrangements as the following:

(A) In FIG. 3, the output of the Schmidt circuit CM may be passed to PT to measure and present as a bit code signal the length of the signal passed through the "not" circuit N. The output of either clipper CL1 or CL2 may also be passed to a Schmidt cathode coupled multivibrator circuit, the output of which is connected to the input of PT. If the gating signals illustrated in FIG. 3 are provided in predetermined positional relationship to the associated picture signal, such that that part of the picture signal which was produced during the line scan of a predetermined portion of the image field containing an area, the width of which it is desired to measure, and the clipping circuit produces a signal output when the input is that part of said picture signal produced during scanning said area, the leading and trailing edges of said signal will cause said Schmidt circuit to produce short pulse outputs and the circuits of FIG. 1B and 1B' including the recordings on channels C4 to CN will provide a code at the output of the binary adder BA which will be indicative of the time lapse between said two signals produced by said multivibrator circuit.

(B) In FIG. 4 the outputs of any or all of the circuits or logical switching circuits AN2–3, AN2–4, AN2–5, may be passed to a Schmidt cathode coupled multivibrator circuit and then to pulse transformer PT shown in FIGS. 1B and 1B' to present in bit form a number which represents the length of the signal passed through said AND circuits. The same may be effected for the outputs of the various NOT switching circuits of FIG. 4.

(C) In FIG. 7 the output of either CL2 or AN2–3 may be passed to a Schmidt circuit and the resulting pulses therefrom to the pulse transformer PT of FIGS. 1B and 1B'.

(D) In FIG. 8 the output of the switching circuit AN2–4 or N may be passed to a cathode coupled multivibrator Schmidt circuit having its output connected to PT of FIGS. 1B and 1B'.

(E) In FIG. 9, the output of CM may be passed to PT of FIGS. 1B and 1B' or the output of AN2–3 to a Schmidt circuit and then to PT for measuring the respective length or difference signal duration.

The resulting output of the binary adder BA of FIG. 1b' may be passed to a recorder or computing mechanism such as the code matching relay to be described and illustrated in FIG. 1C. The output of BA may be used as an error or difference signal in machine control. It may be used for example to correct a machine tool or adjust its position to provide a production or assembly result indicated by the make-up of the picture signal PB which is closer to an acceptable tolerance or standard.

In FIG. 1C, means are provided for effecting automatic control and switching by what will hereafter be referred to as code matching. The apparatus comprises a magnetic recording member 10 such as a magnetic tape, drum or disc having multiple recording channels C1 to CN on which said described sync, picture and gating signals may be provided, as illustrated, adjacent to a group of recordings on channels C4 to CN comprising a pulse code array such as a binary or other code running scale which, if used to energize the associated reproduction transducers PU4 to PUN, will provide at any instant during said reproduction, signals in the output circuits of said transducers equivalent to a particular coded number. If the signals on C4 to CN increase with the length of 10 in a numerically progressing order, and each unit increase in said recorded code scale occupies a particular unit length or any predetermined length of 10, then each of said lengths is identified by a particular code which may be used for control purposes. Said control signal may be generated and used, for example, to effect such functions as closing a normally open gate having an input from the reproduction amplifier through which the associated picture signal PB is being reproduced to pass the part of the picture signal over a further circuit, effect the recording of a signal adjacent the code recording, effect any control, timing, or programming function whereby the tape 10 is driven at a constant speed and a particular code is used to represent a particular time in a cycle.

In FIG. 1C a series of switches R4 to RN are provided which may be manually, pulse or signal operated or may be the switches of a card or punch tape reading device. Said switches, when closed and opened in the order of the preselected code, condition the illustrated circuitry so that a signal will be provided over an output circuit OC when and only when said preselected code appears at the multiple heads PU-4 to PUN reproducing from the magnetic recording member 10. Said recording member may be driven continuously past said heads by a motor or in an intermittent manner by a solenoid actuated ratchet and pawl drive.

When one of the switches R is closed, a signal is transmitted to a switching input "I" of a single input, double output bistable switch FF switching it from an "0" or reset condition to a first, "1" condition. When so actuated, FF switches its input to an output circuit which extends therefrom to a corresponding input of an N input AND switching circuit AN4N. Referring to flip-flop bistable switch FF4, when said switch is in the reset or "0" condition, an input signal thereto, from reproduction amplifier A4, is passed to the switching input of a normally closed monostable switch or NOT circuit N4 opening N4 and preventing a signal from a power supply PS from passing to its output. The output of N4 extends to an input of a bi-stable switch FF'4 and therefrom to the same input to AN4N that the "1" output of FF4 extended to. A logical OR circuit may be provided at the junction of the two outputs which connect to the single input to AN4N if said circuits are not resistance matched. The bi-stable switch FF'4 is switched to its closed or "1" condition by the reproduction of a reset signal passed to illustrated input "1" of FF'4. Said reset signal is also passed to the "0" switching input of FF4 thereby conditioning the circuitry so that a signal will be passed to the corresponding input to AN4N only when there is no output signal from reproduction amplifier A4 (i.e., where there is no signal on channel C4 at the reproduction head PU4). A signal transmitted from A4 will pass through "0" of FF4 to the switching input of N4 and prevent the passage therethrough of the constant output of PS.

The output of switch R4 is also passed to a "0" switching input of FF'4 switching FF'4 to open and preventing any signal from PS to pass therethrough when in said condition. With FF4N switches to state "1," a signal will be passed to the corresponding input of AN4N only when a signal is present at the head PU4 on channel 4. A delay line or relay D4 may be provided in the output of "1" of FF4 to account, if necessary, for the time it takes the switches N-3 to N-N to switch, if provided in the switching action, by the action of the corresponding R switches. It is thus seen, that by opening and closing particular or selected of the R switches, provided that all flip flops FF-4 to FF-N have been reset to "0," a code array is set up in relay storage which will provide a signal over circuit OC when the same code exists as recordings at the heads PU4 to PUN. If the code on channels C4 to CN is a binary code as illustrated, and is of a numerically progressing order, then the inputs for activating switches R may be derived from a digital computer and may represent the desired shaft rotation of the power means driving the member 10. A signal output from AN4N represents the attainment of a degree of movement of 10, as indicated by the code input to the switches R4 to RN. Said output signal may be used to start or stop a servo motor such as SM by activating a relay RE which may also be used to pulse a solenoid, to sound an alarm, or to actuate any electronic or electro-mechanical device, switch, relay, or motor. Reset of switches FF and FF' is effected by manually or automatically closing a switch SW which gates a signal from a power supply PS to a pulse transformer PT transmitting energizing signals to the respective "0" switching inputs of the FF switches and the "1" inputs of the FF' switches.

FIG. 2 shows a section of a recording medium such as a tape 10, having recorded on separate tracks or channels adjacent video signals PB2, HS2, and V2, a number of pulse signals CS-11, CS-12, CS-13, CS-14, CS-15. The latter signal CS-15 which is recorded on channel C9 is the shortest of all the pulse signals and, while it is preferably of a duration in the order of ten microseconds or less when reproduced therefrom, said duration will depend on what phenomenon it is being used to indicate or measure. It s noted that the C-1 to C-15 signals are of decreasing length or duration along 10 and are shown symmetrical with a longitudinal line PL extending across and preferably perpendicular to the direction of recording and passing through the center of the shortest pulse CS-15. This arrangement of recorded signals may be used to indicate the position or region on which a particular point in the video picture signal falls or is expected to fall and may be used for measurement or quality control purposes involving said picture signal. If the image from which the video picture signal PB was produced has a particular characteristic indicative of a position, plane, edge of an object therein or the beginning of a specific area of said image, and said characteristic is scanned by the video scanning camera or device as a change in color or light reflectivity, then the video signal will change in amplitude, which may comprise an inflection in its amplitude if the color or light characteristic of the field suddenly changes. This change in amplitude may be indicated electronically by the use of a proper clipping or filter circuit in the output of the video reproduction amplifier for the video signal reproduction head. By comparing said clipped signal and noting the position of the leading edge of said signal in relation to the position of the CS-12 to CS-15 signals, its position or the region of its position may be indicated electrically. The CS-15 signal may be used to indicate the precise norm or desired position of the surface, plane, line or position of the beginning of the unknown area in the field being scanned. The CS-14 signal recording may be positioned and of such a time duration or length to indicate a range of acceptable tolerance for said picture signal inflection or image position. For example, when the medium 10 is moving at video frequency or the frequency or speed at which the video signal was recorded on 10, then the length of the CS-14 signal may be such that its reproduction will occur in a time interval during which the camera scanning beam will travel across a few thousandths of an inch of surface of the object or image being scanned which will be equal to the combination of the plus and minus tolerance permitted for said image line to be off a desired or predetermined position P1 indicated positionally by CS-15. It is assumed that an area, benchmark, points or a reference line or plane of the object being scanned is prepositioned in the image field and that the object or surface being scanned is at the correct attitude and distance from the video scanning camera or device. Such a method of automatic inspection or measurement may be effected by fixing the video scanning device or camera to scan a particular area or field and providing a fixture or stops in said field being scanned for aligning the object being scanned so that all objects will have a common base, and will be of equal relative scale in the image field. Thus a particular degree of sweep of the scanning beam will represent each prepositioned object being scanned the same length on the surface of each other object scanned.

While the length of the CS signals is proportional to a particular length or distance along any plane in the image field, the positions of the leading and trailing edges of these signals may be electronically detected and may be used to indicate the position of a particular line, plane, or small area in the image field or to effect the measurement of said line or plane from a predetermined line, plane, or point in the field. As stated, the CS1 signal may be used primarily as a means to gate a similar length of the video signal PB to an output circuit and the position of CS1 will determine what particular length of the video signal will be gated. Assuming that it is desired to indicate or measure the distance along a video scanning line between two lines oblique to the beam scanning line which are of different light reflectivity or intensity than the image background and that the position of each of said lines may be indicated as a result of the inflection in the amplitude of the video picture signal by a pulse created as the signal passes a video clipper, such as a pentode clipper, then the CS1 signal will be provided on 10 in a position such that, when reproduced therefrom, it may be used to gate that part of the video signal produced when the scanning beam of the video camera crosses said lines. Since the distance between said lines in the image field may vary from one sample or image field to the next, if the maximum variation for all samples being scanned is known, a gating signal CS1 may be provided of sufficient length to pass the correct section or sections of the video signal for each field or sample being scanned such that each will contain that part of the picture signal containing said two lines. The CS1 signal thus acts to pass only that part of the image signal PB in which it is known that the two lines or points will appear regardless of their variation from tolerance, to the exclusion of all other lines or images in the total video image field. There may be other lines or images of similar light intensity in the field which would ordinarily prevent the comparative or quantitative measurement of the desired length or distance in the image field, the PB sections of which would have to be blanked or otherwise discriminated.

The CS12, CS13, and CS14 signals may serve one or more of several purposes. They may be used to indicate the actual position and variation from a desired position indicated by the center of said signals, of a point, plane, line or area as indicated by an amplitude change or inflection in the PB signal occurring in the range indicated by the CS1 signal. For example, if the pulse created by the inflection in said video signal occurs between the time the leading edge of the CS12 signal is reproduced and the leading edge of the CS13 signal is reproduced then said point in the video signal is known to occur in a particular tolerance range or distance from the norm which may be indicated by the position of the CS15 signal. Similarly, the ranges or distances between the leading edges of the CS13 and CS14 signals and between their respective trailing edges may be second tolerance regions and between the respective leading and trailing edges of CS14 and CS15, third tolerance regions. For inspection of machined parts, the tolerance regions between CS14 and CS15, for example, may be indicative of acceptable tolerances between CS13 and CS14 indicative of acceptable but also of an impending required change in tool adjustment; between CS13 and CS14 indicative of a dimension scanned as not passing inspection and quality requirements but capable of rework; and outside the leading and trailing edges of reproductions of signal CS13 indicative of complete rejection of the part and either shut-down of the machine for readjustment or the requisite that the scanning inspection apparatus be checked. The CS12 to CS15 signals may also be used for automatic sorting purposes whereby an object having a dimension which falls in the range of one of said pulse signals but not in the range of the next smaller signal may be so classified or sorted by pulse means to be described.

FIG. 3 shows a magnetic recording member 10 having multiple recordings thereon and also illustrates associated apparatus for the automatic comparative measurement of a similar length or lengths of two scanning signal recordings which are signals derived from photoelectric scanning of moving objects or video beam scanning of image fields. Said picture signals include a sync or position indicating signal S1 provided on a first channel C1 of 10, two picture signals PB1A and PB1B recorded on channels C2 and C4 and in lateral alignment with each other and the signal S1, and one or more discrete signals SC11, SC12 . . . SC1N shorter than either of said picture signals and recorded in predetermined positions on 10 relative to said picture signals. It is noted that said reproduced SC signals may be used per se or with signals recorded on still other channels of the recording member to perform one or more of the various other gating, control and operative functions described elsewhere in this specification. In FIG. 3, said SC signals are used when reproduced to gate specific and similar lengths of reproductions of the two recorded picture signals, over respective output circuits for automatically comparing the characteristics of said similar lengths of said two signals. For example, one of said picture signals PB1A may be derived from scanning what will hereafter be called a standard image field, which is defined as a field of measurement or inspection which to the optical scanning system of a beam scanning video device contains one or more images or image areas which are (a) in a predetermined position on said field, resulting from a predetermined alignment therein, (b) exhibit other predetermined optical characteristics such as predetermined color or light characteristic. The other signal, PB1B, is preferably derived from scanning another field containing an image area or areas similar in shape, position, or light characteristic to corresponding areas in said standard image field but which may vary in any of said characteristics. Since the amplitude and/or frequency of the picture signals PB1A and PB1B change as the optical characteristics of the image field being scanned changes, said two signals may be compared point by point. Two similar segments or lengths of said signals may thus be compared for amplitude or frequency variations by the means provided and the resulting differences in signal variations indicated by apparatus such as illustrated. Before describing the technique of comparative measurement of FIG. 3, it will be noted that while the method of measurement utilizing the recordings of said two picture signals provided in fixed relation to each other on a magnetic recording member, has numerous advantages, it is possible to perform the same function by recording said standard image field signal PB1A in a fixed or predetermined position relative to sync signal S1, for example, and providing said second picture signal in the circuitry illustrated during the same time it is provided in FIG. 3 by the reproduction apparatus illustrated, by utilizing the reproduction of said S1 signal to trigger, for example, the sweep of a video storage tube read-beam to scan a charge pattern recording of said second picture signal and produce said second signal over said illustrated circuitry. Similarly, it is possible to provide both said picture signals recorded on respective storage tubes and to effect their simultaneous reproduction by means of a signal derived by the reproduction of the sync signal S1, whereby the member 10 serves as a signal generating medium for generating said SC signals at predetermined instants during the reproduction of said two picture signals. The method of recording all signals in predetermined positions relative to each other has numerous advantages including the provision of a recording which may be rechecked or rescanned if necessary or changed in characteristic and which may be filed for future reference or used to modulate the write beam of a picture tube for visual monitoring. The recording of at least said standard image field signal on member 10 has additional advantages in that it may be one of a multiple of related but different picture signals recorded on said member and may be selectively reproduced therefrom adding flexibility to the apparatus and permitting it to be used to perform a multiple of inspection functions relative to different image fields or devices.

Assuming that the signal PB1A has been derived from the surface of a work member or X-ray structure of an object or subject which conforms to specified dimensions, surface characteristics or light characteristic and that said image field contains areas of different light or radiation intensity or other characteristic which will result in signal variations in a predetermined segment or segments of said picture signal, then the position or positions of similar variations in the signal derived from scanning field containing images to be measured or compared. While the apparatus shown in block notation in FIG. 3 provides one method of comparing the positions of image areas in the standard image field with image areas of fields to be compared therewith, modifications to said apparatus are possible which will provide not only the same type of measurement but other inspection functions such as counting, noting image variations of areas in a particular area or areas of the field being scanned which do or do not conform in position, light intensity, shape or size with areas of said standard image field.

It is also assumed that means are provided for prepositioning at least part of the scanned image area or the object being scanned in the scanning field of the video scanner to produce said picture signal, PB1B, with variations therein representing particular areas of said image field, and provided in a predetermined range or area of possible scatter so that a basis for measurement and comparison is provided. For example, if it is desired to compare the position of one or both of two areas in a field being scanned with the position of similar areas in a standard or known image field, and said areas are permitted to fall at random in said field, then one of said areas of one field may positionally overlap the comparative area of the standard image field which may result in an incorrect measurement.

The electrical apparatus of FIG. 3 comprises a multiple of reproduction transducers PU1, PU2, PU3, and PU4 for reproducing the signals from respective channels C1 to C4. Said transducers are shown laterally aligned across the member 10 for simultaneously reproducing aligned sections of signals recorded on said channels. The heads may be staggered provided that similar provision is made in positioning of the respective recorded signals, it being desirable to reproduce the start of said two picture signals simultaneously by their respective transducers. It is assumed that both picture signals were initially generated by respective scanning beams initially positioned at the same points in each field being scanned or at a predetermined point on the surface of the object being scanned so that if said image areas being scanned are to the same scale in relation to the scanning device, and are similarly aligned, similar points in the resulting picture signals will have similar field coordinate positions.

The signals reproduced by reproduction heads PU1 to PU4 are amplified by means of reproduction amplifiers A1 to A4 respectively. The output of amplifier A2 is passed to the input of a normally open, monostable electronic gate or switch G1 and the picture signal output of A4 to the input of a second gate G2. The switching inputs of G1 and G2 receive the output of A3 amplifying the signal SC1, SC2 . . . Said gates G1 and G2 may be any monostable electrical switching device adapted to switch at the required rate and to effect the completion of a circuit between its input and output whenever a signal reproduced from C3 is present at the switching inputs and to disconnect said circuits or when said signal is no longer present thereat. Various electron tubes and semi-conductor gates are known in the art and may be used for switches G1 and G2. Thus, if it is only desired to compare image segments in predetermined areas of said two fields being scanned or compared, or particular lengths of said respective picture signals, the positions of the SC signals and their lengths will provide segments of both said signals on measurement circuits which segments were produced during beam scanning said predetermined areas of said fields or said specified lengths of said signals.

It is also assumed that the picture signals PB1A and PB1B were derived by beam scanning means which provides a picture signal during scanning which varies in amplitude as the beam scans areas of different light characteristic. If, for example, the field being scanned contains an image area of one color or light intensity on a field of a different color or intensity, then as the beam crosses from said field to said image area or vice-versa, the picture signal produced during said beam crossing will experience an inflection in amplitude. Scanning and video systems are known which produce a picture signal which changes in frequency when the field scanned changes in optical characteristics or radiation intensity and, while amplitude change and detection of said change is utilized throughout this invention for measurement purposes, it is noted that known means for detecting predetermined changes in frequency may also be applied. Thus, if it is desired to compare the position of an image or part of an area in the standard image field with the position of a similar area in another field, the locations of the respective inflections in said two signals produced during scanning said similar areas may be compared by comparing their time relationship in the output circuits of the respective amplifiers A2 and A4. The outputs of G1 and G2 are passed to respective clipping circuits CL1 and CL2 which may be standard video diode or triode clippers adjusted to a desired clipping level, which will indicate by a signal output therefrom or termination of a signal output therefrom, when said inflections in said respective picture signals occur. The gates G1 and G2 have the further advantages in limiting the input to the clipping circuits CL1 and CL2 to predetermined lengths of the respective PB signals which, for example, may correspond to segments of said signal produced during the scanning of a specific area or areas of said total fields. Thus, any other areas in said respective image fields, which vary the same degree in light intensity or characteristic as those being measured, will not confuse the measurements and will not give false results.

The outputs of clippers CL1 and CL2 are passed to a logical two-input AND switching circuit AN1–2 which produces a signal over an output therefrom when a signal is present at both inputs. Thus, if a line image is in the same coordinate position in the standard image field as in the other field being scanned, provided that the other mentioned conditions of recording and reproducing said two signals simultaneously and initiating said beam scanning actions at the same point in each of said fields are met, and each of said line images as it is scanned, causes an inflection of short duration in said respective picture signals and said inflections cause respective pulse outputs from said respective clipping circuits, then an output will be produced from the AND circuit AN1–2 which will be indicative that said two images where crossed by respective scanning beams and are in the same coordinate positions in said two fields.

The mentioned indicating technique will suffice if it is merely desirable to compare a point in one scanned field with a point in a second or standard image field whereby the output of the AND circuit may be passed to a counter or recorder. However, if it is desired to scan a larger area of a field to determine if one or more points in said field, or one or more border sections vary in position from a standard, or where a specific border or line starts to vary from a standard, then further indicating and computing apparatus is necessary.

In FIG. 3 the output of AN1–2 is passed to the switching input of a normally closed monostable switch or logical NOT switching circuit N1. Whenever an output from AN1–2 is present at N1, said switch will open and break a circuit between its input and output. The outputs of CL1 and CL2 are also passed to the inputs of a logical OR switching circuit O–1, the output of which is connected to the input of N1. Thus, if either clipping circuit produces an output at a time when the other clipping circuit is not producing an output, said output signal will be passed through the NOT circuit N1. An output from N1 will thus be indicative that the inflection or change in the signal PB1B occurs either prior to or after the occurrence of the respective inflection in the standard signal PB1A. Physically this may be interpreted as the shifting of the position of a border or line in an image field being scanned, either side of a predetermined position as determined by the position of a similar section of an image in a standard or quality acceptable field or pattern. If it is desirable to determine which side of the standard or desired coordinate position, border or line said image being investigated falls, then one of several techniques may be employed. For example, one of the two inputs to the OR circuit O-1 may be eliminated or may be opened by manual switching means at some time after an output has appeared at N1.

A technique for determining where in the picture signal PB1B or said field scanned to produce said signal, an image varies from a desired or standard position defined by the PB1A signal, is illustrated in FIG. 3. The technique employs what will hereafter be referred to as a digital clock or timer referred to by notation DIT. The timing device DIT is started by pulsing an input F thereof and will produce a pulse code such as a binary digit code over parallel circuits 22 whenever a trigger input TR of said timer is pulsed. Thus, if the output of NOT circuit N1 is passed to the trigger input of DIT, a signal code is available which indicates the time lapse from the time the timer is first energized. If the output of N1 is of such a duration and occurs during a time interval whereby the timing element of DIT advances more than one position or time increment, then multiple code signals will be transmitted over the parallel output circuits 22 and by counting the number of said codes transmitted, the degree of which said sampled image area varies from a standard image position may be determined. The output of 22 is shown extending to a computing circuit which may be an input CO to a digital computer adapted to record or otherwise utilize said digital information for computing or control purposes. In a simpler form, CO may be a counter or switching circuit adapted to energize servo devices for performing such functions on work being scanned as sorting, marking, assembly, or the like. In more complex arrangement, CO may be one of a number of digital computing mechanisms adapted to convert the digital input, after operating thereon, into one or more signals for controlling various actions which control results from a decision or decisions made by utilizing said input information. Such actions as readjusting a machine, stopping, starting, marking, and the like may be controlled by computing mechanisms, and will depend on the results obtained from scanning.

It is further noted that other circuitry hereafter described may be utilized to improve or extend the utility of the apparatus of FIG. 3 and the use of such apparatus will depend on the characteristics of the phenomenon being measured and the design of the computing or measuring circuits CO. For example, the output of the NOT circuit N1 may be passed directly to a recording device or to a computer CO' which may be used to record said signals and provide an output for operating a warning device or servo when said signals become greater than a predetermined duration or length. The output of N1 may also be connected to a cathode coupled multivibrator CM, the output of which is connected to the input TR of DIT. Said multivibrator Schmidt circuit is adapted to produce a first short pulse at its output when the leading edge of a longer pulse appears at its input and a second short pulse when the trailing edge of said longer pulse appears at said input. If these pulses are each used to provide a respective coded output over the circuits 22 which are indicative of their relative time relationship, then by subtracting said first digital code from the second generated code by employing known digital computing means in CO, a difference signal or code will be obtained which will be indicative of a difference between the coordinate position of that part of the image area of the standard field being scanned and that of the part of an image area being compared therewith in the field scanned to produce the PB1B signal. The resulting difference digital signal obtained from subtracting said two outputs of DIT may be recorded and/or automatically compared with a code or number recorded in the recording section of the computer CO. As a further variation in the illustrated technique provided in FIG. 3, a pulse code such as the binary digit pulse code PC on channel C5 of member 10 may be provided, reproduced and passed to the computer CO. The code PC' is reproduced by reproduction transducer PU5 and amplified by reproduction amplifier A5 prior to being transmitted to CO. Code PC' may represent, for example, in binary digital notation, a number equivalent to the maximum permissible difference between the mentioned two pulse code outputs from 22 resulting from said two, leading-trailing edge signal created short pulse outputs of said cathode coupled multivibrator. By matching said two digital codes (i.e. the reproduction of PC and the difference signal computed by CO) it can be automatically determined if the variation in that part of the position of that part of the article or image being scanned and the position of associated part of the standard image, is greater than the degree specified by the code recording PC'. The difference signal or number which has been obtained by subtracting said first input number from DIT to CO from said second input, may be subtracted from the digital signal obtained by reproduction of the recording PC and the result is a number which indicates how close the deviation in the position of said article or image area being scanned is to a maximum permissible deviation from a standard position. This latter result may be used to effect the positioning of a tool or other device by operating a servo motor through an equivalent degree of motion or angular position proportional to said difference signal or code.

The signal PC' of FIG. 3 may also be replaced by one or more laterally aligned code recordings of the type referred to by notation PC illustrated in FIG. 1. If additional recording channels C5 to CN are provided with means for simultaneously reproducing a particular array of pulse recordings at one time by, for example, providing a digital code signal output over parallel circuits to CO at a particular instant or short time interval in the measurement cycle, then said codes PC may vary in value from point to point along 10 and may be used to perform or effect different operations or functions. If multiple PC codes are provided to indicate maximum permissible variations in the positions of the standard image and that being measured, then each PC recording may be used to indicate the variation in the position or dimension in a particular part or dimension of the total image or article being scanned. For example, the maximum variation or permissible tolerance from a specified position of a first object or component assembled on a chassis may be X inches and of a second object Y inches. A first code PC is provided opposite or just prior to those parts of the picture signals produced during beam scanning said first object which is indicative of said first permissible maximum variation. A second code PC is provided in a position or position along 10 to be reproduced just prior to or during those parts of the picture signals produced during beam scanning said second object. The first output of the cathode coupled multivibrator or the signal SC reproduced from 10 may be used for switching purposes in the computer CO such as switching the associated PC code, reproduced from 10 during the time interval defined by said SC signal, to a particular storage unit such as a relay storage where it is held and used for comparison with the associated output of DIT. Further details of such a switching function will be described hereafter.

FIG. 4 shows magnetic recording means and associated reproduction circuitry for determining one or more of the following phenomena: (a) if a given image portion or area in a field being scanned falls in a particular position in said field or if reference points, lines or planes of a given image fall in predetermined positions in said field, (b) where in said total field or how far off a reference point, line or area in the scanned field a given point, image area or line falls. Examples of the above scanning means include such investigative functions as determining if the border of an area or areas such as the edge of a work piece, part or assembly falls along a particular array of coordinates to determine if the workpiece is precisely positioned on an assembly or is fabricated to tolerance. It is assumed that another surface or area of said work piece is in a fixed position in said field to establish a benchmark or base for said comparative measurement. The means of FIG. 4 may also be used in determining if lines, or areas on a map, scope, drawing or photograph, fall along predetermined positions. It is again assumed that part of said map or drawing is in a referenced position in said field being scanned. The arrangement of FIG. 4 may also determine the degree of variance of phenomenon such as described above from a predetermined position or positions in said field; and if any other image phenomenon which is characterized by a variation in light characteristic, exists in a given scanning field.

For the purpose of simplifying the description of the signal recording arrangement and apparatus of FIG. 4, reference is made to FIGS. 2 and 4'. In FIG. 2, multiple pulse signals are provided each on a different channel of the magnetic recording member 10 to indicate the position of a change or inflection in a video picture signal by noting during which of said pulse signals said variation is reproduced, and similar recording arrangements are provided in FIG. 4 at various positions illustrated as signals P1 and PN recorded on 10 which represent precise coordinate positions or distances generated from the start of the picture signal recording where changes such as inflections in said picture signal will occur if the surface being scanned is precisely positioned relative to the scanning apparatus when the field scanned to produce the PB signal is similar to a standard image field. Thus at each of the P coordinate positions multiple pulse signals are provided which bear the general notations SC1N, SC2N, SC3N. The SC3N signals are located at the P positions. When said inflection in said PB signal is reproduced simultaneously with the corresponding SC3N signal, the condition may be indicated by use of a logical switching AND circuit which produces an output when said condition occurs, said output signal indicating that the line or area being measured falls at a predetermined location or coordinate position in the image field. Reference is also made to FIG. 4' which shows a fragment of an image field IFP being scanned. The horizontal lines ST–L represent the trace of a raster scanning beam. The recording means and apparatus of FIG. 4 may be utilized to determine if an area such as the band LN is positioned in said field IFP with its borders at predetermined coordinate positions therein. LN may be such phenomena as the silhouette image of a machined part, a line or curve on a graph, map or drawing, etc. For many measurement functions, if another surface of said machined part is prepositioned in the field IFP or prepositioned relative to the scanning device, a maximum variation of an image thereof such as LN, from a predetermined position in said field may be determined and noted by means of measuring the lengths of the SC1N signals. If the area LN is of a different color or light intensity than the surrounding area, it will cause, when scanned, a change in the resulting video signal such as an inflection in amplitude in that part of the signal produced when the camera scanning beam scans said image line. The maximum expected shift in the position of LN either side of the predetermined position illustrated, is indicated by the length of the longest signals SCN on channel C3. If the line in the image field should fall beyond the band or area having the width SCN in FIG. 4', then that part of the picture signal PB obtained when the camera beam scanned line LN will not be gated by the associated SCN signal. From FIG. 4', it is noted that a definition of the SCN signals of FIG. 4 is that they are pulse signals of such a length, duration and position on magnetic recording member 10 relative to the associated video picture signal PB, that when said SCN signals are reproduced therefrom, their presence at the switching input of a normally open monostable electronic gate may be used to gate only those segments of the PB signal which were produced when the video scanning beam scanned the band area ASCN (of FIG. 4') having the width SCN. A narrower band area ASC2N having a width SC2N and centered within the larger band area, similarly defines the SC2N signals of FIG. 4. It is noted that while these band areas are assumed to be fixed in the field IFP and provide increasingly smaller regions which approach the area or line P, the actual position of the image area or line LN may shift from one sample being scanned to the next and may fall either side of the line P of FIG. 4'. As stated, the area of maximum expected dispersion of LN is assumed to have the width SCN. Whereas, in FIG. 4' it is assumed that the line LN may shift in its absissa or X value only, from $Xp+SCN/2$ to $Xp-SCN/2$, where $Xp$ is the X coordinate value of the line P, other scanning arrangements may have a line image or area of any predetermined shape. Whereas in FIG. 4, the SC3N signals, which indicate the desired or basic position of the line or band LN, are of equal duration and are equispaced, for other measurement problems the spacing of said SC3N signals will depend on the shape or other characteristic of the line or phenomenon being scanned and the type of image scanning employed to produce the picture signal.

In the upper left hand corner of the image field IFP is shown the image of a line LA which may comprise a mark on the article, map or surface, part of the edge of said image or some other characteristic of said image being scanned which may be used to indicate if said article or surface being scanned is aligned in the field IFP and/or provided in the correct scale therein. The image line or area LA will produce changes or inflections in the PB signal and these may be compared for position in the picture signal with short pulses recorded on 10. Said pulses are shown on channel C–6 of FIG. 4 and are referred by the notations CS6–1, CS6–2 . . . . If the pulses CS6–N are all produced simultaneously with a corresponding pulse caused by the inflection in the video signal PB, each time it scans the line LA, then by the provision of logical switching circuits in the outputs of the reproduction apparatus, and a clipping circuit for clipping said inflections in the PB signal, an automatic indication may be attained that the object or surface containing the line or optical phenomenon LN is properly aligned in the image field and/or provided to correct scale therein. If these conditions are not met, a warning device may be actuated to indicate that corrective action must be taken by a human operator before automatic scanning may be continued.

The apparatus of FIG. 4 is illustrated in block diagram notation for the purpose of simplifying the drawings. Various standard electrical components such as reproduction amplifiers A1 to A6, video clipping circuits CL, gates G, logical AND switching circuits AN logical NOT switching circuits N and the like are provided and are known in the art. It is assumed that each of these circuits is provided with a power supply of sufficient magnitude. Similarly, these circuits are assumed to be capable of switching at the required frequency for effecting precision in measurement.

The circuitry illustrated in the block diagram of FIG. 4 may be utilized to determine, (a) if the surface, article, map, drawing, photograph or other object containing the image LN to be scanned is to the correct scale in the image field IFP and is correctly aligned relative to the optical or flying spot scanning system of the video device effecting said scanning and, (b) just where in the area of possible dispersion said LN image falls. Multiple magnetic reproduction heads PU1 to PU6 are provided aligned across the tape 10 over channel C1 to C6 for simultaneous reproduction of any of the illustrated signals.

The head PU2 rides against channel C2 containing the picture signal PB and the signal reproduced thereby is amplified in a reproduction amplifier A2. From A2, the signal is passed to a clipping circuit CL2 adjusted in clipping level to pass only those parts of the PB signal of a desired amplitude such as the inflection portions generated as the scanning beam scans LA and LN. The output of CL2 is passed to a monostable, normally-open electronic gate G2 having a switching input from A3 and a logical AND switching circuit AN6–2. The other input to the logical circuit AN6–2 is from the amplifier A6 of the reproduction head PU6, so that the signals CS6–N will be passed thereto. If the reference line or area LA in the image field in permitted to be a predetermined degree off scale or off a specified position or basic position in the field, IFP, the permissible scatter may be accounted for in the length of the CS6 signals. The output of A6 is also passed to a delay line D6, the output of which is connected to the input of a logical NOT circuit N6. The switching input to N6 is from the output of AN6–2. Thus if a signal is reproduced from the track C6 at a time when no signal is produced at the output of CL2, an indication that the reference line LA on the object or surface being scanned, is not at a predetermined position or attitude in the image field IFP, a signal will be produced at the output of the NOT circuit N6. The delay circuit or line D6, is provided of a time duration to account for the time required to switch AN6–2 and N6 although for many applications, it may not be required. If signals are simultaneously reproduced at the output of CL2 and A6, AN6–2 will produce an output and switch the normally closed NOT switch N6 to "open" so that the signal from A6 will not pass therethrough to an alarm or other device AL6. AL6 may be a relay, which when energized by an output from N6, is adapted to effect such actions as the stopping of the measuring apparatus, rejection of the part of article being scanned, etc., by energizing an electrical device such as a relay actuated solenoid.

Circuitry is provided to determine where in the image zone referred to by notation A–SCN, the image LN falls. Respective reproduction heads PU3, PU4, and PU5 scan channels C3, C4 and C5 and reproduce the illustrated signals therefrom. The reproduction amplifiers A3, A4 and A5 amplify the signals reproduced by their respective heads. The output of A3 is passed to the switching input of gate G2, closing said gate while present thereat and permitting any signal or signals, produced at the output of CL2 while said gate G2 is closed by the presence of a reproduced SCN signal thereat, to pass to three circuits including inputs to AND switching circuits AN2–3, AN2–4, and AN2–5. The other input to AN2–3 is from A3 so that when CL2 produces an output at the same time that one of the SCN signals on channel C3 is being reproduced, an output will be produced from AN2–3 indicating that the change or inflection in the PB signal, caused by the scanning beam sweeping across the area LN, falls in the region A–SCN of the scanned image field. The output of AN2–3 may be passed to a counter, recording device or further logical switching circuit I2. The output of A3 is also passed to the switching input of a NOT circuit N2–3, the signal input of which is derived from clipper CL2. Thus if the area or line LN falls outside of the area A–SCN, such that the change in the PB signal occurs and is passed to CL2 at a time when no signal is present at A3 to be passed to open N2–3, said signal clipped by CL2 will pass through N2–3 to a circuit I2–3 which may be an alarm, recorder or relay adapted to energize a counter or actuate a solenoid or other device. The output of switch G2 is also passed to one input of a logical AND switching circuit AN2–4. The other input to AN2–4 is from A4 so that, if an SC2N signal is reproduced at the same time an output is produced from CL2, a signal indication is obtained that the line LN falls in the region or area ASC2N having the width SC2N shown in FIG. 4' as a narrower band or area closer to the required position of LN, at $X=Xp$, $Y=0$ in FIG. 4'. The output from AN2–4 may be passed to a counter, recorder or relay I4. If I4 is a pulse counter, it may be adapted to produce a pulse over an output circuit upon receipt of a particular number of pulses from AN2–4. If LN is a curved line or band or is oblique to the horizontal X-axis of the image field, a predetermined number of pulses prodduced from AN2–4 will indicate that a particular part or percentage of the total line LN falls within the area A–SC2N. If it is desired to discover where in the image field the line LN deviates in its position so and falls outside of a given limit, defined for example as the band area A–SC2N, assuming that said line can vary from one sample scanned to the next in a manner whereby part of said line may fall within said given area and part beyond said given area, a code indication of where said deviation occurs may be derived as follows: A pulse counter PCO is provided having a counting input PC connected to a normally inactive pulse generator PG. The trigger input to the pulse generator PG is from the output of reproduction amplifier A1 which receives the reproduction of the S1 signal on channel C1. Since the S1 signal is indicative of the reproduction of the start of the PB signal, and is used to trigger the pulse generator PG, the number of pulses produced by PG after being so triggered is an indication of the length of the recording member 10 moved past the reproduction heads and, hence may be used to indicate the position of a particular point in the picture signal PB such as a deviation from tolerance.

The pulse count or pulse signals received by said counter activate said counter for indicating where in said video PB signal or in said image field said deviation or other occurrence takes place. The phenomenon measurable by the apparatus of FIG. 4 is a point or area in the image field IFP where the line LN first extends beyond or leaves predetermined area A–SC2N which may physically be interpreted as a deviation from tolerance, a change in a predetermined image condition, or an image change such as in the shape of a manufactured part. Said indication of position may be attained as follows: It is assumed that the counter PCO is initially set at zero and is adapted to start to count upon receipt of a first pulse from the pulse generator PG which is triggered by reproduction of a S–1 signal as the recording passes head PU–1. When a second input PCR to the counter PCO is pulsed, said counter either stops counting or provides signals therefrom indicative of the count received prior to energizing PCR by means of said pulse which signals are transmitted to a circuit I–6 which may be a recorder, relay, part of a logical computing circuit or other device. In FIG. 4 the input PCR is adapted to receive a pulse when the inflection or change in the PB signal caused as the beam of the scanning camera first sweeps across the area LN, is reproduced by PU–2 when part of the SC2N signal associated therewith is not reproduced therewith. The pulse transmitted to PCR is indicative of this condition since it is the output of clipper CL2 and can only be passed through a normally closed NOT gate NCR when there is no signal at the switching input of said gate from A4. An output through NOT circuit NCR indicates that the line or border of the area LN in FIG. 4' falls outside of the limits or area defined by the SC2 signals yet, due to the gating action of the SC1 signals, when said line falls within the limits defined by the signal on C3. Two other functions which may result when a signal is produced and passed through NCR are also illustrated. The output of NCR may also be passed through a time delay switch or delay line D2 to the resetting input RT of PCO to automatically reset said timer to condition it for the next measuring function. The output of NCR is also connected to a relay RE6 which may actuate a warning device, solenoid or motor for causing such an action as rejection of the article being inspected, stopping a production machine, etc. The output of the counter PCO may be provided on a single or multiple parallel circuits for transmitting a parallel pulse code therefrom whenever PCR is energized to the input of 16 which may be a recorder, computer, switching circuit, relay or other device.

The pulse generator PG of FIG. 4 may be eliminated from the circuitry as follows. Instead of recording a single pulse S1 on channel C1, multiple equi-spaced short pulses are recorded thereon preferably extending the length of the PB signal. The length of these pulse signals, which will be referred to as SN signals, will depend on the length of the PB signal. If the heads PU–1 to PU–6 are laterally aligned across a magnetic tape 10, then the first signal S1 will preferably be positioned at or near the start of the PB signal and the number of SN signals which pass and are reproduced by the head PU1 at any instant during the reproduction, will be an indication of the length of the PB signal which has been reproduced up to that instant. If the output of amplifier A–1 is thus passed directly to the pulse counting input of a counter such as PCO which has been set at zero, and said counter is stopped and caused to read out a value of the total number of counts received by an input such as from N6, then the total pulses received until receipt said latter input will be an indication of the length or position of the PB signal at which said latter pulse was received.

In FIG. 4A a code generating means is provided in place of the pulse counter PCO of FIG. 4 to indicate the position or positions of specific images or parts of images in the total image field represented by the video picture signal PB. For example, various measurement, computing or control functions may require the automatic indication by means of electrical signal means indicating the position of a line in the image field or a portion of a line in a predetermined part of the image field. If the field IFP of FIG. 4' is considered the X—Y plane of a coordinate system and the origin is predetermined by the coordinates as $X=0$, $Y=0$ located at the lower left hand corner of said field, then any point in said field may be referred to as having a positive X, Y coordinate. A means for determining the coordinates of a point in field IFP in FIG. 4 of a particular point in the PB signal is to initiate counting when first reproducing the PB signal by gating the output of a pulse generator PG and noting the total count or number of pulses generated thereafter at any instant. However, if device I6, connected to the output of counter PCO, is a digital computer which is adapted to utilize the output of PCO for automatic computational purposes, then said output is preferably provided in binary digital pulse form. Counters are known in the art which will provide a binary pulse code output at any instant during their operation by pulsing their input. If counter PCO is such a digital output counter, a pulse transmitted thereto from NOT circuit NCR may be utilized to indicate by means of binary codes, variations in the picture signal PB recorded on channel C2 of member 10. In FIG. 4A means are also shown for providing an instantaneous binary pulse code output on parallel circuits to the input of a digital computer CO, which code is an indication of the location of a particular point in the picture signal, and, depending on the circuitry employed to energize said code producing apparatus, said code may serve as an indication of the location of a particular change in said picture signal thereby digitally indicating the position of a particular part of the image in field IFP.

In FIG. 4A, an analog to digital converter ADC of conventional design, is employed to provide a digital pulse code on parallel circuits CKC which are connected to the input of a digital computer CO. The converter ADC may comprise for example a constant speed motor driven, shaft switching device having multiple brush contactors which sweep a coded contact area of a coded disc which produces a digital code over parallel circuits indicative of the position of said shaft at the instant an input TR is pulsed. The output of the amplifier A–1 which is connected for reproducing the recorded S1 pulse, passes said pulse to the starting input S–ADC of the converter driving motor to start the cycle. It is therefore assumed that the shaft of said converter is at a zero position prior to starting. The code triggering signal to the trigger input TR of ADC may originate from any of the logical switching circuits or gates of FIG. 4 depending on what is desired to be indicated by means of a digital code signal. For example, if the image phenomenon in the field IFP comprises a line such as LN of FIG. 4' or a simple analog curve, and it is desired to indicate by coded signal means the coordinate points in said field where said curve or line falls, then the input to TC is connected to the gate G2 of FIG. 4. Each time an inflection occurs in the reproduced picture signal PB, a parallel digital code will be produced over the multiple parallel circuits CKC and transmitted to the computer CO. If it is desired to indicate where the area AC of FIG. 8' for example, varies from the predetermined area position as indicated in FIG. 8', then the pulse input to TR may be derived from one of the outputs of the logical AND switching circuits AN2. The selection of which output to use will depend on which of the limits, denoted by the signals SC1, SC2, SC3 . . . it is desired to measure variations relative to. The output of NOT circuits N23, N24, etc., will provide a code indication at the computer, by activating the input TR of ADC, when a change in the PB signal occurred resulting from the area scanned falling outside the limits defined by the signals on channels C3 and C4. The input RE–ADC to the analog to digital converter is connected to a reproduction amplifier A–7 which reproduces a signal from a seventh channel of recording member 10 (not shown) which signal is positioned thereon to be reproduced after the reproduction of the PB signal and is used to either stop ADC at its zero position or activate start a servo which drives ADC to position a shaft thereof at said zero position. If the swicthing shaft of ADC is adapted to make one revolution during the time it takes to reproduce the PB signal, then a limit switch may be provided mounted adjacent said switching shaft of ADC adapted to be closed when one revolution of said shaft has been made and to thereby stop said driving motor at said zero position. Pulsing the control A–ADC during the next cycle by means of a signal reproduced from channel C–1 may be used to bypass switch RE–ADC and start said converter driving motor to start the next inspection cycle.

FIG. 4B is a diagram showing further details of a digital clock or timer of the type DIT utilized in FIGS. 3 and 4. As stated, the digital clock is adapted, when operative, to transmit therefrom a digit binary code at any instant after starting when an input TR is pulsed, said code being indicative of the time passed from the starting of said clock. If the cycle of timer DIT is activated at a predetermined time during the reproduction of the picture signal PB, the position of any point in said PB signal may be indicated by generating a pulse signal at the instant said point in said picture signal is reproduced or exists in a circuit and by passing said pulse signal to the input TR of DIT. The resulting code transmitted over parallel circuits 22 will be indicative of the time said clock was pulsed.

The digital clock of FIG. 4B is electro-mechanical and is a modification of the conventional shaft position encoder in that it is driven after starting at a constant speed and indicates unit time lapse whereas the conventional encoder is a variable speed device which is driven by a variable speed motor the shaft of which is speed controlled by an analog signal. The clock DIT may utilize certain components of a conventional shaft encoder, namely a shaft digitizer assembly ADC' having the conventional code disc therein and readout means. Assuming that ADC' is a photoelectric type of encoder, it may contain the conventional code disc driven by shaft 16 and has a readout flash light source which is energized when a signal is present at input TR, a radiation limiting slit between the code disc and light, a slit system on the other side of the code disc and a multi-element photoelectric PbS cell on the other side of the slit system. The cell elements which receive light through the disc pass pulse signals over te output circuits 22 to CO. These elements, while not illustrated in FIG. 4B are known in the art and are part of the encoder section of the type 309–13, the photoelectric shaft position encoder produced by Electronic Corp. of America. The shaft 16 is driven by a constant speed motor 12 through reduction gears preferably of a ratio of 100 to 1 or greater depending on the time constant of the clock and the running speed of the motor 12. The motor 12 may be any constant speed, rapidly accelerating motor. It is noted that during the time of acceleration accurate code signal indications of time lapse can only be obtained if the acceleration is constant or occurs always in a predetermined manner. If the motor is provided to accelerate at constant rate or always in a predetermined manner and contains the necessary controls to maintain a constant speed thereafter, it may be calibrated so that a particular pulse code generated on the outputs 22 with the shaft 16 initially provided at a zero set point, will always indicate by code the same time lapse from said starting. Notation 12 also represents known automatic control apparatus for rapidly accelerating said motor in a predetermined manner and control means for maintaining the speed of said motor constant thereafter.

The starting and stopping of clock DIT, and its reset to zero, may be effected by a combination of switches including a pulse actuated flip-flop switch for starting and stopping the motor 12. The switch is indicated by the blocks having notations F and S. When F is pulsed, a circuit is completed between a power supply PS and the motor 12 and or its constant speed control. When the input S to the flip-flop switch is pulsed, said switch switches to open cutting off the power supply. In the apparatus of FIG. 4, if the input to F is derived from amplifier A1 and if member 10 is driven at constant speed, then at any particular instant after F is energized by the reproduced S1 pulse, a particular code will be transmitted from the encoder and said code will be indicative of said time interval.

The output of the converter ADC' consists of multiple parallel circuits 22 over which said digital pulse code is transmitted whenever an input pulse appears at a trigger or gating circuit 20. The input line 20 extends from the gate G2 and the output code from ADC' effected when 20 is energized, will indicate the point at which an inflection occurred in the PB signal.

The digital timer or clock DIT may be reset to zero as follows. A bi-stable solenoid 24 is mounted adjacent the shaft 16. A cam projection 18 is provided on shaft 16 which during normal operation of the device rotates and clears the retracted shaft 26 of the push pull solenoid 21. The solenoid has two inputs, F and R. When F is pulsed its shaft 26 projects. When R is pulsed, 26 retracts. Mounted on the end of 26 is a limit switch 28 which is projected into the path of cam 18 when F of 21 is pulsed. The limit switch 28 is provided in circuit with a power supply PS and when closed as it engages 18, a signal thereby to the stop control S of motor 12 and R of 21. The solenoid shaft 26 is thus retracted and the motor 12 stopped with the shaft 16 provided in a predetermined or zero position. A delay relay 30 in the circuit of 28 and R of 24 may be used to delay the retraction of 26 so that the shaft 16 may come to rest against 26. The pulse transmitted to F of 21 is derived from an amplifier A7 which amplifies signals recorded on a seventh channel C7 of the member 10 which signals are provided indicating the end of the particular recording or desired computing function.

In FIG. 5 a signal recording arrangement is provided on a magnetic recording member 10 applicable for operating on or gating particular lengths of a video picture signal which correspond to those parts of the video picture signal PB derived during the beam scanning of a particular area or areas of the image field or object being scanned. The recorded signals of FIG. 5 comprise a sync signal S1 provided on a first recording channel C1 for indicating the position of a video picture signal PB on a recording channel C2. Multiple pulse gating signals SC1, SC2, SC3 . . . etc., preferably of predetermined duration, are provided on a third channel C3 in predetermined positions adjacent the PB signal. The SCN signals are preferably of a length and are positioned relative to the picture signal PB such that they may be used to gate or effect operations on, similar lengths of the PB signal. If the length, spacing and positions of the SC signals are predetermined, then that part of the total video picture signal PB which was produced during the camera beam scanning of a particular area of the total field being scanned, may be gated thereby or operated upon and the segments of the PB signal which are so gated will be determined by simultaneously reproducing the PB signal and the SC signal. If the reproduction heads are laterally aligned across the magnetic recording member 10, as illustrated, then each SC signal may be used to gate an equivalent, adjacent length of the PB signal. For gating or operating upon those segments of the PB signal created during the video scanning of a specific area or areas of the total field being scanned, the lengths, spacings and positions of the SC signals relative to the PB signal will not only be determined by the shape of the selected area or patch of the total field being scanned but also by the type of scanning employed. If, for example, raster scanning is employed across a rectangular scanning field, a rectangular area or patch in said total field which has its sides parallel to the borders of the total field will be represented in the PB signal by a series of equi-length, equi-spaced segments of the picture signal. The segments of said picture signal may be reproduced and scanned or otherwise operated upon by the provision of similar lengths of gating signals SC recorded on channel C3 which SC signals are equi-spaced, and by reproducing said SC signals simultaneously with the picture signal. The presence of the reproduced SC signal at the switching input of a normally closed electron tube gate will effect the gating of an equal length of the PB signal. By predetermining the lengths, spacings and positions of the recorded SC signals, any particular area or areas of the total field being scanned, may be gated in this manner or otherwise operated upon. The SC signals may be provided by a pulse generator, of known design. Either reproduction of the sync pulse S1 or the first part of the picture signal may be utilized to trigger the operation of said pulse generator to correctly provide the SC signals for recording onto channel C3.

Still another means for providing SC or CS signals on 10 of the correct length, spacing and position may comprise scanning an object or image field by beam scanning means and passing the resulting video picture signal to a beam storage tube and recording it on the storage element thereof. Next, the recording member 10 is driven past its recording and reproduction heads and reproduction of the S1 signal is used to trigger the read beam of said storage tube. The resulting output of said tube is passed to a clipping circuit of the type described and the output of the clipper is recorded on C3 as a series of discrete signals. If the signal recorded in the storage tube is derived by scanning a mask or map having position predetermined black or white areas of sufficient light contrast on background fields and said mask or map is correctly positioned in the scanning field of said beam, scanning means and provided at the proper image scale, then SC signals of the desired length, spacing and position may be generated and recorded on C3 by selection of the correct mask pattern. A means for providing such a mask is as follows:

Reference is now made to FIG. 8' which shows an image field IF provided at the scanning plane of a video scanner or video camera optical system. Raster scanning is utilized in FIG. 8' and the scanning field is assumed to be rectangular. Notation ST refers to the horizontal lines traced by the video camera scanning beam which sweeps across several areas referred to by notations A–A, A–B, and A–C which areas are each crossed by a number of horizontal scanning sweeps. Each of said areas are assumed to be of a different light characteristic or color than the background BF of said field IF. If it is desired to determine if the area A–C falls within a specific band area A–C' of the field, the apparatus off FIG. 4 may be used to effect said indication. The signal recordings of FIG. 5 consist of a series of gating signals SCN provided of equal length and equal spacing along the recording member if the scanned area A–C' is rectangular and if the borders of said scanned area are parallel to the borders of the image field IF. Each time the beam scans path ST and crosses the leading edge E1 of area AC, an inflection occurs in the amplitude of the picture signal. If the background area to the right of image area AC is the same light intensity as the area on the left side of AC, said picture signal will exhibit the same amplitude generated before scanning AC when the beam sweeps past the trailing edge E2 of A–C. The area AC may represent any optical phenomenon, such as a cutout in a panel, a component assembled on a device having a general surface of different color than AC, the crossection, shadow or end view of an object, one object or area in a field of many such as illustrated by AB and AC.

If the area AC of FIG. 8' is positioned in a known position in the field IF, and it is required to measure or indicate only the positions of similar shaped areas in other scanned image fields, then the signals to be recorded on channel C3 of FIG. 5 may be obtained by placing a mask over the areas AA and AB of essentially the same light characteristic as the background of said field, scanning the field IF with a video image scanning camera such as a Vidicon or Iconoscope tube passing the resulting picture signal to a clipping circuit such as CL–2 of FIG. 4, and recording the output of said clipping circuit on the magnetic tape 10. The recorded signal S1 is used to start or trigger the beam scanning the field IF. Hence the phenomenon to be measured is recorded and may be reproduced at the correct instant so that the signals SC1, SC2, SC3 . . . SCN may be used to gate only those parts of the picture signal PB generated during scanning the area AC while excluding signals generated in scanning areas such as AA and AB. In order to generate and record on member 10 signals SCN for gating portions of the picture signal generated in scanning an area AC' which area is larger than AC and has a marginal area around AC to account for permissable small shifts in the position of AC from one work-piece or specimen being scanned to the next, and to generate gating signals modified to account for permissable shifting or movement of AC in the image field, the optical system of the scanning device may be enlarged the necessary degree to make the sides or borders of the area AC fall on the coordinate lines LE and TE which respectively represent the sides of the area AC' and determine the leading and trailing edges of said SCN signals. After effecting said enlargement of the image area AC and masking of the areas AA and AB, so that the background of image field IF is essentially of one light characteristic with the area AC of a different light characteristic, the modified field may be scanned and the picture signal output passed to a clipping circuit the output of which is recorded as described to provide the SCN signals on member 10.

FIG. 6 illustrates a recording arrangement and associated transducing apparatus for reproducing and/or modifying a portion or predetermined portions of a video picture signal PB recorded on a magnetic recording member or tape 10, whereby control of said reproduction signal modifying is effected by one or more signals recorded in predetermined positions relative to said PB signal. In FIG. 6, a single control signal CS–1 is shown provided on channel C–3 of the recording member 10 adjacent the PB signal and in such a position whereby it may be used to gate or otherwise effect an operation on a similar and predetermined length of the PB signal. The signal S–1 on channel C–1 may be used to record either the PB signal or CS–1 signal in predetermined relative positions, one after the other is recorded thereon. The CS signal may be passed, as described, to the switching input of a normally off gate G–2 after being reproduced by reproduction transducer PU–3. When switch G–2 is closed by the signal reproduction of the CS recording passed thereto, that part of the PB signal present at reproduction head PU–2 will be passed through said gate. A particular segment or segments of the PB signal such as the segments produced during the beam scanning of a particular area in the image field may thus be gated and passed to a circuit CK which is adapted to operate in a predetermined manner on said gated segments of the reproduced picture signal, by means of the gating signal or signals recorded on track C–3. The circuit CK is provided to perform one or more of a number of functions on the gated segments of the PB signal passed thereto. If segments of the PB signals are gated by multiple pulse signals on C–3 of predetermined length and positioned such that said gated segments correspond to the picture signal sections generated during the video scanner sweep of a particular area of the total field being scanned, then functions such as amplification, attenuation or erasure of said gated sections may be effected by the circuit CK which will produce a corresponding change in the image generated by said signal if used to modulate the writing beam of a video picture tube to create a still image on the screen of an image tube. The output of CK, which provides a modified segment or segments of the video signal PB, is passed through a delay line D–CK and then to a recording amplifier RA–CK operatively coupled to recording head RH2 positioned to record onto channel C–2 the modified section of the video signal. The time constant of delay line D–CK is preferably such that the start of the signal segment CK arrives at the recording head RH as that point of the recording member 10 which was present at the reproduction head PU–2 when said segment was first reproduced, is adjacent RH. While it may be advantageous to record the reproduced and modified segment of the PB signal gated by the signal or signals on track C–3 directly over the recorded section of the PB signal from which it was reproduced, for certain functions it will be necessary to erase the section of the PB signal from which the output of CK was produced. To effect this function, the signal reproduced by PU–3 is also passed through a delay line D3 and then to the switching input of a normally open electronic gate G–E which is adapted to complete a circuit between a power supply PS and magnetic erasure transducing device EH such as a magnetic erase head as long as said CS signal is present at said switching input. The delay line D3 is of such a time constant that the erasing transducing apparatus EH and head is energized to effect erasure of the track C–2 only during the time interval when that part of the PB signal which was reproduced by PU–2 and gated through G2 to CK is aligned with the erase head. The modified signal passed through the circuit CK will then be recorded on an erased section of the channel C2 in the exact position previously occupied by the original gated section of the reproduced signal.

The apparatus of FIG. 6 may also be used to perform functions which are commonly employed in still or motion picture photography, such as: (*a*) fading or blanking or erasure of a particular area or areas from a picture or image field such as is commonly done in retouching a photograph, (*b*) fading or reducing the image intensity of an area or areas of the total image field being scanned and reproduced, (*c*) increasing the brightness or amplifying the image of a predetermined area or areas of the total image field being scanned and reproduced, or (*d*) recording a second image signal over a particular area or areas of an image field.

In order to effect the last function, that of recording a new signal or signals on a series of lengths of the recorded picture signal to effect the production of a new image in said image field when said picture signal is used to modulate the write beam of a video storage or picture tube, it will be necessary to obtain said picture signal by reproducing it from a recording device.

FIG. 6 also shows means for effecting this action of recording a new picture signal onto a particular length or lengths of the channel C-2 between the leading and trailing edges of the PB signal already recorded thereon. Said recording arrangement comprises a video storage tube ST having an input W-1 energizable for writing a video signal into the storage element of said tube and a reading output R-1 on which is generated a reproduction of the recorded video picture signal when a trigger pulse is received at read beam trigger input R-2. The trigger input to R-2 may be derived from A-3. If the storage element of ST is capable of producing a signal, when scanned by its read beam which, when recorded on 10 of FIG. 6 as said recording member is driven at the same speed in which PB was recorded, it will produce a recording having the same length as recording PB, and if the image area in the storage tube recording element is located along the same coordinates of the storage tube's storage element as in the field scanned to generate PB, then the signal segments for affecting said image area may be recorded onto the correct lengths of channel C2 as follows. The signal S-1 is reproduced by a reproduction head PU-1 as the leading edge of picture signal PB first passes reproduction head PU2 and is reproduced and passes to the trigger input R-2 of ST. The read beam of ST starts its sweep and the resulting output signal thereof is passed through a gate GT which is normally open and is closed when a signal is present at its switching input which is connected to A-3. A delay line D-T is provided between A-3 and GT to account for the time required for triggering the read beam and it is assumed that the S-1 signal is provided in a position to permit the reproduction of S1 to trigger ST to provide an output signal therefrom at the instant the leading edge of signal PB passes head PU-2. This lag if any, can be also accounted for in delay line DT' which is connected between GT and the recording amplifier RA-2 for recording head RH-2. The recording amplifier RA2 is positioned where RA-CK is connected to delay line DT' and recording head RH-2. The time delay constant of DT' is such as to delay the passage of the signal from ST a sufficient time to permit the tape 10 to travel the distance between PU-2 and RH-2. The gate GT is utilized to blank out all parts of the signal transmitted from ST except those of equivalent length and reproduced when the signals CS on C3 are reproduced.

In FIG. 7 a series of gating signals SC1, SC2, SC3 . . . SCN are provided on channel C3 of magnetic recording member 10 adjacent a video picture signal PB, which as in the other hereinabove described examples may comprise a composite video signal with picture, blanking and horizontal as well as vertical sync pulses provided therewith. Each of said SC signals are of a particular length and are recorded spaced apart in positions relative to said PB signal such that they may be used, when reproduced simultaneously therefrom with said PB signal, to gate particular or predetermined lengths of said PB signal which were generated when a video scanning camera beam scanned across a particular area or boundary in the image field being investigated. If an object or surface is prepositioned in the field being scanned such that a point or points on the surface of the object are at predetermined coordinate positions in the scanned image field, then a particular area or areas, determined by said multiple gating signals SC, may be investigated to determine if smaller areas, spots, lines or the like of different light characteristic than the background of said selected areas exist therein. For example, surface defects such as scratches, marks, holes, discoloration, and the like which appear as images of different light characteristic than the general surface due to shadows, change of reflectivity or greater absorbtion of light, will cause a variation in the amplitude or frequency of the video picture signal when said surface is scanned. If PB is a composite video signal recorded on channel C-2 or if other areas of the field being scanned are of equal or greater light variation than the surface defects or image phenomena being investigated, the gating signals SC may be reproduced and employed so that such phenomena will not confuse the functions of measuring, counting or of otherwise determining the existence or extent of such defects, since said SC signals may be used to gate only sections of the picture signal PB generated while scanning the area of the image field in which said defects or phenomena to be measured occurs, to the exclusion of other areas of said image field.

In FIG. 7 the SC signals are reproduced by head PU-3 and passed to one input of a logical AND switching circuit AN2-3. The picture signal recording PB is reproduced by magnetic reproducing head PU-2 and passed through a reproduction amplifier A-2 to a clipping circuit the output of which extends to the other input of AN2-3. The clipping circuit AN2-3 is adjusted in clipping level to detect the image phenomena or surface defects in the area determined and gated by the SC signals for investigation. Whenever both signals from CL-2 and A3 are present at AN2-3 an output signal is produced therefrom. Said output signal may be utilized in one of a number of manners. The presence of such an output signal may indicate a defect or undesirable characteristic of the surface being scanned and may be used to energize a relay which may effect one or more of such functions as the ringing of a bell, or energizing of other types of alarms, the stopping or starting of a servo motor or actuation of a solenoid for rejecting or transferring the part being scanned, or the pulsing of a counter. It may also be desirable to count the pulses passed from AN2-3 in a counter such as TC, which may contain circuit means for emitting a pulse therefrom for control purposes if a predetermined count is exceeded during the passage of the entire PB signal. Notation AM refers to an alarm triggered by an output from TC.

FIG. 8 is a schematic diagram illustrating signal recording and reproduction means including control circuits for automatic dimensional measurement. Means are provided for automatically and rapidly determining if a dimension in an image field, such as the distance between two surfaces, which is discernible by variations or inflections in the light or color of the image defined at the limits of the investigated dimension, is positioned in a particular or predetermined area therein and is of the same length as a standard or comparative dimension. Said comparative dimension may be the length of or distance across a similar component or area conforming to a given dimensional standard, such as provided across an article of manufacture which is dimensionally acceptable and conforms to precise dimensional measurements according for example to engineering specification. Measurement and position of the dimension or dimensions being inspected and compared is accomplished in FIG. 8 by use of a video picture signal derived by video camera beam scanning the surface of the object or area being measured or compared. It is assumed that said picture signal PB may be recorded or otherwise provided whereby it may be passed to a measuring circuit or circuits at a time whereby the generation of said signal is synchronized to the reproduction of other gating and position indicating signals recorded on a magnetic recording member. In the hereinabove described video measuring and control techniques, one or more video picture signals are recorded on a magnetic recording member in a precise position relative to one or more control or gating signals so that said other signals may be reproduced to gate particular lengths of the video signal and to indicate the position of particular points or areas in said video signal. It is to be noted that the same results may be attained by recording the video picture signal on any other medium, such as on the surface of a storage tube provided that it can be reproduced therefrom in a manner whereby it is synchronized in time to the generation of said other signals. This may be accomplished in the arrangement of FIG. 1 for example, by reproducing the frame indicating or sync signal S1 and employing said signal to trigger the sweep of the "read beam" of a storage tube to provide said video picture signal on an output circuit at the same instant that it will be reproduced from a recording on a magnetic recording member adjacent the other signals as described. Similarly, the picture signals of the other figures including FIG. 8, may be recorded on other than the illustrated magnetic recording members. Said video storage tube may also be replaced by a deflection controlled camera scanning the image field being investigated such that the video scanning beam is triggered to effect a controlled scan by the signal reproduction of the sync signal recording S on track C–1. In FIG. 8 the article or surface being investigated is located relative to the video scanner such that the image presented to the optical system of said scanning apparatus is of a predetermined scale and is aligned in said scanning field in a predetermined position so that comparison can be made by the reproduction of said pre-recorded multiple gating and switching signals at predetermined intervals during the reproduction of said video picture signal.

In FIG. 8 multiple signals are shown recorded on magnetic recording member 10 including a sync signal S1 for locating a video picture signal PB which is recorded adjacent S1 on a second track C2. A third and fourth signals CS3 and CS4 are recorded on tracks C3 and C4 respectively. For measurement of a particular length or distance in the video image field, the signals on track C–4 comprise two signals CS4–1 and CS4–2 which represent the end limits of the dimension or length being measured. CS4–1 for example, is positioned relative to the PB signal such that it will be reproduced therewith and with an associated length of said PB signal which is generated when the video camera scanning beam crosses that part of the acceptable or standard image in the scanning field which is located at one end of the dimension being compared. Referring now to FIG. 8' to illustrate the significance of the spacing, positions and lengths of the gating signals of FIG. 8, it is noted that in FIG. 8' there is provided a rectangular image field IF which is scanned in a raster type scan by the video camera scanning beam. In said image field BF multiple black or dark areas denoted A–A, A–B, A–C are located on a bright or white background B–B such that each of said areas or patches will effect when scanned, a variation in amplitude in the video picture signal. In order to discriminate between the different areas of similar or nearly the same light intensity, a signal CS–3 on channel C–3 is provided to gate only that part of the video signal which is produced when the beam scans the area A–C or a particular portion thereof, which is the particular area to be investigated or measured. Recorded signal CS3 has a length "L" which is derived during scanning the distance "L" illustrated in FIG. 8' which extends across the rectangular area A–C and includes a brief distance either side of A–C but not so far as to possibly overlap the other areas AA and AB. The area A–C is shown as rectangular having side borders which are parallel to the borders of the total image field IF. The dimension of "L" will be determined by the degree that the patch area A–C may shift in position from one sample or area being inspected to the next and the closeness of an adjacent area such as AB which would cause a similar variation or inflection in the video signal generated during scanning AC which would cause an incorrect measurement or prevent measurement. The dimension D represents the width or length of that part of an acceptable or standard area AC which is crossed or scanned by the video camera sweep beam. In FIG. 8', D represents the required or specified width of A–C and is shown in FIG. 8 as a distance between a center-line drawn through signal CS4–1 and signal CS4–2. The tolerance or accepted degree that the leading edge E1 of the area A–C may be shifted from its specified position, may be indicated by the length of the signal CS4–1 and the acceptable degree that the trailing edge E1 of area A–C may vary from its specified position. It may be indicated by the length of the signal CS4–2. Thus, the distance between the center-line of CS4–1 and the leading edge of CS4–1 may be considered a plus tolerance and the distance from said centerline to the trailing edge of CS4–1 may be considered a minus tolerance as defined in conventional measurement practice. These dimensions are respectively referred to in FIGS. 8 and 8' by the letter notations +T and –T. The length of CS4–1 is equivalent to 2T, the dimension or length of which, as stated, is determined by the speed at which the picture signal generating beam is scanning the image field and the acceptable variation of said area from a desired or specified point or line in the image field. If the area A–C has within its borders, image characteristics which would interfere with the comparison-measurement function, the gating signal CS–3 may be provided as two or more signals falling sufficiently on both sides of the centerlines of the CS4 signals to permit the comparative measurement to be effected.

In FIG. 8 reproduction heads PU–1 to PU–4 pass signals, reproduced from their respective channels as 10 moves relative thereto, to respective reproduction amplifiers A–1 to A–4. The reproduction of the PB signal is passed to a clipping circuit CL2, which is adjusted in clipping amplitude or level to produce a signal output therefrom when the increase or decrease in amplitude caused by the sweep of the camera beam is moving across the edge of area A–C, appears in the reproduced signal PB. The appearance of this signal at CL2 thus indicates the position of the leading edge of the image area AC being compared. The reproduction of signal CS3 is passed to the switching input of a normally open, monostable gate or switch G2 to maintain said gate closed and complete a circuit while said reproduction of CS3 is passed therethrough. The output of CL2 is passed to a Schmidt circuit CM which is a cathode coupled multivibrator having an inverter at the output of the mutivibrator. Said Schmidt circuit will produce a short pulse output each time a signal at its input inflects a predetermined degree in amplitude. For example, if an elongated pulse is passed to CM, the leading edge of said pulse will cause a short pulse to be produced at the output of CM and the trailing edge of said pulse will cause a second short pulse to be produced at said output. Thus, if the clipping circuit CL2 produced a signal of a given duration generated as that part of the reproduced PB signal which was produced as the scanning beam scanned across an area such as AC in the image field, of a different light intensity or color than the surrounding field, the distance across said area along a specific scanning line of the scanning path STL may be determined by measuring the length of said signal or the distance between the two points where said picture signal PB changes in amplitude. If the area AC provides, when so scanned, an increase or positive inflection in the picture signal, then CL2 will produce an output signal whenever its input is energized by that part of the picture signal generated when the beam crosses from border to border of AC. The Schmidt circuit CM will produce short pulses when the leading and trailing edges of the signals from CL2 arrive thereat. The gating signal CS3 will determine which of the sweeps across AC will be used for measurement and will prevent the passage of signals produced by CM as the result of scanning the other areas AA and AB in the field IF. The output of Schmidt circuit CM is passed to one input of a logical AND circuit AN2–4 the other input of which is connected to the output of A4. The output of CM is also passed through a delay line D2 to the input of a logical NOT circuit N2, the switching input of which is connected to the output of the AND circuit AN2–4. D2 is provided to account for the switching time of AN2–4 so that, if a pulse is produced at the output of CM at the same time that CS4 is being reproduced, it will not pass through the NOT circuit N2 but will be stopped by the appearance of a pulse generated by AN2–4. When there is no output from N2, the leading edge and/or trailing edge of A–C falls within the area or position indicated by CS4–1 and CS4–2. If the pulse should be produced from CM when there is no signal output from A4, the AND circuit AN2–4 will not produce an output and said pulse will pass through the NOT circuit N2. The output of N2 may be connected to one or more of a number of electrical devices such as a relay or recording head. The relay RE may be used to activate a warning signal generating device, stop a machine, effect a visual or magnetic recording, send a signal to a computer, etc. A simplification of the recording arrangement and apparatus of FIG. 8 involves the elimination of the signal CS3, its reproduction apparatus and the gate G2. However, the channel C4 must be noise free and cannot contain other signals which would give a false indication of the condition of the PB signal. If the recording member 10 is a magnetic drum or closed loop tape, it may be rotated or travelled at constant speed and may be used to repeat the described comparative measurement by either intermittently recording and erasing a PB signal of the phenomenon being measured from 10 or providing said position indicating signals CS at time intervals and synchronized to the generation of a video picture signal generated in scanning said phenomenon. The signal S on channel C1 may be used to trigger the sweep of a video camera scanning device to start producing said picture signal at a predetermined instant when a particular length of the recording member 10 is passing the reproduction heads or is in a predetermined position relative to said heads during its travel so that a similar effect will be attained as obtained in recording said signal on a specified length of said member 10 relative to said other signals and simultaneously reproducing said signals therefrom.

FIG. 9 illustrates means for automatically measuring a distance or distances between points in a video image field such as the distance between two coordinates where a scanning line STL crosses the borders of a particular area in said field or the borders of two predetermined or specified areas. As an example of such measurement reference is made to FIG. 8′ in which is shown a rectangular image field IFP′ having an area or patch AC therein characterized by a different radiation or light intensity than its surrounding field area. To simplify the description, the sides or borders of AC are parallel to the borders of the field IFP′. The width D of AC may be automatically determined by automatically measuring the length of that part of the picture signal produced during scanning the width of said area, or, assuming that scanning speed is constant, determining the time it takes for the beam to travel from one border to the other. If it is known how long it takes for the scanning beam to travel a unit distance across the area or surface AC, then the width or any predetermined dimension of AC may be measured by timing the interval it takes for points in or portions of the picture signal generated by such scanning to each exist in or arrive at a measuring circuit. The actual distance D, provided that the area AC is of a known and predetermined scale in IFP′, is obtained by multiplying the time it takes for said beam to sweep across said area by the proper time constant which may be derived if the speed of scanning is known and the time it takes for the scanning beam to sweep or travel a unit distance is determined. If the picture signal generated in scanning the field is recorded on a magnetic recording member 10, as shown in FIG. 9, while said member is driven at constant speed, then distance D may be determined by accounting for the speed of said tape, the time interval between the reproduction of that segment of the PB signal generated when the scanning beam crosses the border E1 of AC during a single line scan and the reproduction of that segment of PB generated when said beam crosses the border E2.

FIG. 9 shows means for effecting a measurement whereby the picture signal PB derived by scanning field IFP′ is recorded in a predetermined position on a magnetic recording member 10 relative to multiple gating signals CS3 provided at predetermined positions on channel C3 and CS4 recorded on C4. As hereinabove provided, PB need not be so recorded if it may be generated in a measuring circuit such as that illustrated in FIG. 9, at a predetermined time relative to the generation of the other illustrated signals. Whereas in FIG. 8 the length of a short pulse signal on C4 determined a tolerance range for the position of a line or border image in the field, in FIG. 9 such a positional tolerance is determined by the positions of the respective leading edges of signal recordings CS3–1 and CS4–1. This is effected by passing the output of reproduction amplifier A3 which is the reproduction of recorded signal CS3–1, to an input of a dual input AND circuit AN23, and the output of reproduction amplifier A4 to the switching input of a normally closed monostable gate or NOT switch N2 which is switched to open when a reproduction of the CS3–1 signal is present thereat. Thus, if there is an input to N2 resulting from a predetermined change or characteristic of signal PB being clipped in video clipper CL–2, there will only be an output from AN2–3 if CS3–1 is being reproduced but not CS4–1. The positions of the leading and trailing edges of CS3–1 and CS4–1 thus determine the tolerance range of the position of the border of the area or other optical line phenomenon being measured. It is noted that CS3–1 of FIG. 9 has the length equivalent of L in FIG. 8′ and CS4–1, the length equivalent to L minus 4T where T is the distance in the field IFP′ along which the border of AC may shift either side of a normal or standard position without falling outside of a desired tolerance range. The signal CS4–1 of FIG. 9 has the effect to blank and prevent transmission to AN23 of any signal generated in scanning the area or areas being measured, which may be reproduced when a portion thereof falls beyond the limits of the inside tolerance limits. Thus, any image areas situated within AC which would confuse or prevent measurement are eliminated from said measurement, if area AC has areas within its borders similar in intensity to IFP′. CS4 may be so positioned on the recording member and of a length to prevent the passage of any signal from the clipping circuit which will produce an output and interrupt the signal passed therethrough while CS3 is present to thereby produce variations or multiple pulses in the output of AN2–3 which will switch the flip flop FC. For example, the area across which it is desired to effect a lineal measurement may not be an area void of interior images such as AC of FIG. 8' but may be an annular area, or an area having changes or interruptions such as LA' in the composition of the image pattern within its borders which changes will cause variations in the picture signal which will confuse or prevent measurement. To effect dimensional measurement by scanning, as described, it is necessary to block any output from CM to the measurement apparatus illustrated which is not a pulse generated by the signals produced at leading edge and trailing edge of the border of the area being scanned for dimensional measurement. The position of signal CS4 is such that, when reproduced and passed to a logical NOT circuit, it will prevent the output signal from CM produced during the same time interval as CS4 is generated from passing to the AND circuit AN2–3. This is effected by connecting the output of amplifier A4 to pass the reproduction of the CS4 signal or signals to the switching input of NOT circuit N2 thereby disconnecting or breaking the circuit between CM and AN2–3.

Also illustrated in FIG. 9 are means for automatically adjusting certain of the circuit variables such as the clipping level of the clipper CL2. This may be effected automatically without manual adjustment by the provision of one or more signals recorded on said recording member in positions to be reproduced to effect the desired adjustment by controlling a servo motor coupled for providing said adjustment.

FIGS. 9 to 12 illustrate means for automatically adjusting the clipping level of CL2 one or a number of times during an automatic measurement cycle. Means are also provided for effecting the selection of one of a multiple of outputs K1 to KN over which to gate the results of measurement, and it is noted that a number of other functions may also be automatically adjusted by reproducing prerecorded signals from member 10. For example, the degree of amplification or attenuation of all or part of the picture signal may be adjusted by recording one or more signals on channels C5 to CN of the member 10 in positions to be reproduced and effect the required adjustment or control prior to or during a measurement cycle. If record member 10 is driven at constant speed, the duration of a signal recorded on and reproduced therefrom prior to or during the reproduction of the picture signal PB, may be employed to drive a servo motor from a zero set condition for a predetermined time to position the shaft of a variable resister, capacitator or inductance a predetermined adjustment. A series of equi-spaced-duration pulses reproduced from a single auxiliary channel may also be passed to a solenoid for stepping a switch to a selected position to select one of a plurality of output circuits on which to transmit the results of measurement. A digital code recorded either in series or in parallel on multiple of said auxiliary channels may be passed to the input of a digital to analog converter or shaft positioner which is adapted to adjust a variable potentiometer or rotary switch. In FIG. 9 servo motor SM is coupled through gears GR to the shaft of a variable potentiometer Rg in the grid-cathode circuit of the clipper CL2 to effect a predetermined adjustment of the potentiometer shaft by means of a signal reproduced from C8. In FIG. 9, a motor SM is controlled by forward and reverse controls F and R which are energized by signals reproduced from channels C8 and C7. Thus, if member 10 is driven at a predetermined and constant speed past the reproduction heads, the length of a signal recorded on said member will be equal to a specific time said signal exists in the output of the respective reproduction amplifiers. A signal of a particular duration recorded on channel C8 will maintain the control F of motor SM energized for a particular time whereby the shaft of the servo motor SM will be driven a predetermined number of rotations which is used to preset or to predetermine the clipping level of clipper CL2. This may be effected by controlling said motor to positionally control the shaft of the potentiometer Rg in one direction by signals reproduced from channel C7 of 10 and in the other direction by signals reproduced from channel C8 the reproduction amplifier A8 of which is shown operatively connected the forward drive control F of servo SM as shown to preset the shaft of the variable potentiometer Rg in the grid-cathode circuit of the triode tube 6J5 of the clipper CL2 as illustrated in FIG. 10. A signal recorded on channel C7 may be of such a length to reset the shaft of potentiometer to zero as shown in FIG. 11 after which a signal reproduced from C8 and fed to the forward drive control F of motor SM may preposition said shaft to adjust the potentiometer. In FIG. 11 a limit switch LSW is shown adjacent a zero stop pin SMS which, when actuated by the brush arm BA of the variable potentiometer Rg, is adapted to stop motor SM at a reset shaft position. For conventional video apparatus, variable potentiometer Rg has a range of 500,000 ohms to 3 megohms permitting any predetermined level of video amplitude in the picture singal range to be clipped according to the setting of said shaft RPS.

A second method of presetting the potentiometer Rg is to record one or more digital codes on one or more channels of 10, reproduce these at a particular instant during the reproduction of the picture signal recording PB or prior thereto and use said code to effect the angular positioning of said shaft. FIG. 10 illustrates apparatus for effecting such shaft positioning by means of a digital to analog converter DAC. The input to DAC may be a series or parallel digital code reproduced from recordings on the tape 10. The digital to analog converter consists of a control unit DAC' for receipt of said digital input from A5, and a setting unit DAC''. The setting unit DAC'' positions the shaft to the number of revolutions and fractions of a revolution determined by the coded signal input reproduced from recording member 10. The output shaft of DAC'' is coupled by gear means GR to the shaft of the variable resistor Rg, the setting of which determines the clipping-level of CL.

Also illustrated in FIG. 9 are means for automatically selecting one or more circuits over which to gate information derived from the measuring operation described. The output of pulse counter CT is connected to the input of a multi-output selection switch referred to by the notation MC which is a rotary stepping switch capable of attaining one of a particular number of switching positions as predetermined by pulse signals provided at an input ST thereto. A signal to a resetting input RT resets said switch to a zero switching position.

The output of counter CT, which may be a digital pulse or pulse train indication of the count, may be passed to one of a number of computing, recording or control circuits for effecting or performing various computing, recording or control functions. In FIGS. 9 and 12, means are shown for automatically gating the output of ST to one of multiple circuits K1 to KN. Signals recorded on recording member 10 are used to select which of the circuits the output of CT will pass to. It is noted that this means may also be employed to gate segments of the picture signal PB to one of a plurality of different circuits or to gate the output of any of the other illustrated devices such as clipper CL2, or Schmidt circuit CM to one of multiple circuits for recording, measurement or computing purposes. The notation MS refers to a multiple circuit rotary switch having its input connected to counter CT. In FIG. 12, switch MS is illustrated as comprising the combination of a solenoid SOL operative when its input is pulsed, to actuate a ratchet and pawl mechanism RP to step a shaft RPS to move a potentiometer electrical wiper arm RPW to the next switching position. The input to solenoid SOL is derived from the reproduction amplifier A5. If RPS is reset to a zero position, the number of pulses recorded on C5 will determine the position to which RPS is moved and, hence, the switching of the input to the selected output circuit. A servo motor MS, actuated by a signal reproduced from channel A6 may be used to reset or drive the shaft RPS to a zero position at the end of the measuring cycle. It is noted that the electro mechanical switching means of FIG. 12 may be replaced by an electronic device such as a magnetron beam switching tube with the input from A–5 connected to effect the switching of said beam one switching position each time a reproduced pulse is received thereby. The hereinabove described means for effecting automatic switching may also be used to gate a selected of a plurality of signals or voltages to one or more selected circuits adapted to effect measurement of the type described prior to or during the reproduction of the picture signal.

It is noted that the recording arrangement and measuring apparatus of FIG. 9 is subject to a degree of variation without departing from spirit of the invention as related to automatic dimension or positional measurement. For example, the pulses produced at the output of the respective Schmidt cathode coupled multivibrator circuit CM by the leading edges of the reproduced CS–3 and CS–4 control or gating signals may be used to define a measurement or tolerance range along a scanning line in the field being scanned. If amplifier A3 is connected to a Schmidt circuit CM it too will produce a pulse when the leading edge of signal CS–4 appeals. The first pulse produced by the leading edge of CS–3 may be used to start a digital timer of the type described and the second mentioned pulse to reset said timer. A pulse or pulses produced by clipping and passing the picture signal PB through a Schmidt circuit CM may be used to effect a binary digital code output from said timer which is indicative of the location of said change in said picture signal between the leading edges of said CS–3 and CS–4 signals. The leading and trailing edges of the CS–3 and CS–4 signals may thus define the limits of a dimension or proportional tolerance range. Also, the pulse counter CT may be replaced by a digital timer of clock DIT of the types hereinabove illustrated, and used to indicate by a digital output therefrom where said change occurs in said picture signal relative to said CS signals or to the beginning of said picture signal. In the latter example, the digital timer may be started by the reproduced signal S1, the first pulse output of AN2–3 or another signal recorded on and reproduced from C1 or on any other channel which signal is positioned in a predetermined location relative to the picture signal PB and indicative of the location of a tolerance range for the particular image phenomenon being measured.

In FIG. 13 is shown an isometric view of an apparatus for automatically scanning work-in-process and for determining, by one of the means hereinabove described, such phenomenon as (*a*) if the contour or shape of a work piece conforms to a given contour or falls within specified dimensional limits of a given contour, (*b*) if a particular or predetermined part or dimension of said work piece conforms to a predetermined dimension and/or is positioned relative to other parts or areas of said workpiece within given dimensional limits, (*c*) if predetermined image areas exist or do not exist on said work such as production markings, components assembled therewith, imperfections of components or material, etc., (*d*) the actual measurement of a predetermined or specified dimension across said work or across part of said work, (*e*) other of the numerous functions commonly performed by visual or manual means or mechanical measuring devices in inspecting or measuring work-in-process or finished goods.

In FIG. 13 a means for conveying a series of articles of manufacture past a scanning station SC–ST is provided and comprises a conveyor CV illustrated as an endless motor driven belt but which may be any known type of article conveyance. For the purpose of simplifying the description, the work or article W to be scanned is shown as an oblong block or box-shaped solid with a series of steps formed therein. Any dimension, across the article such as the illustrated D1 and D2 dimensions extending across the first two steps in the upper face of W, may be automatically determined by the means provided in FIGS. 9 to 12. The positions of said step-like formations relative to one end W' of W may be automatically determined by the means of FIG. 4, or the position of an area such as W1 which may comprise a hole, formation on said part, or component assembled therewith, may be determined by the means of FIG. 8. The recording member 10 illustrated in FIG. 14 comprises a closed loop tape which is continuously driven in a fixed path at a constant speed for effecting said recordings and reproduction relative thereto by magnetic transducing heads RH and PU.

At a scanning station SC–ST, a video camera CAM is fixed on a mount relative to the conveyor CV and is focused to scan the surface WS of the work which faces the camera when said work is aligned at a predetermined position on said conveyor and the front end WE of W is at a predetermined position in the longitudinal travel of the conveyor. Simple means are provided in FIG. 14 for aligning the work W relative to the scanning camera CAM although it is noted that more complex alignment means or fixtures may be needed depending on the shape of the work, the characteristics of the scanning device CAM and its optical system, and the precision required of the automatic measurement.

The work W travels in the attitude illustrated in FIG. 13 along the conveyor CV prior to reaching scanning station SC–ST. The plan view of the apparatus shows an alignment bar AB extending over the conveyor against which bar the work W is pushed by a pusher bar B1 which is operated by an air or hydraulic cylinder CY1 mounted adjacent the conveyor. Operation of CY1 is effected when the leading surface WE of the work has reached a predetermined point in its longitudinal travel in the scanning field IF. A photoelectric cell PH and photoelectric control PHC therefore are provided which control transmits a pulse over an output circuit when light from a light source LS mounted across the conveyor, is cut or interrupted by the work W as it moves past. The interruption of the light source initiates the action which prepositions W in the scanning field by utilizing said pulse to activate a control for an air cylinder CY2 which thereafter projects an arm B2 across the conveyor against which the face WE of work W comes to rest aligning W in the field when bar B1 is projected by cylinder CY1 to force face WS of the workpiece against alignment bar AB.

The work W is thus essentially provided in a predetermined position relative to the scanning camera CAM with the surface to be scanned, WS, at a predetermined attitude relative to said camera scanning field. The output of control PHC is thus passed over two circuits, a first connected to a control F of CY2 which is one input of a solenoid actuated electro-mechanical flip-flop switch which opens a valve and actuates the cylinder CY2 projecting the bar B2. The pulse is also passed to a time delay switch D2 and therefrom a pulse is transmitted to the forward control F of cylinder CY1. The delay period of D2 is such that B1 will be projected against W a time interval thereafter which is sufficient to permit the surface WE to engage and align itself against bar B2. When workpiece W is so aligned, scanning of the field by scanner camera or flying spot scanner CAM may take place in such a short interval that B1 and B2 may be retracted within a fraction of a second after B1 has urged W against AB so that the conveyor CV need not be stopped during the action. Thus CY1 is adapted to automatically retract at the end of its forward stroke and the return travel of CY1 may be used to activate a limit switch which completes a circuit with a solenoid closing or opening valve to activate cylinder CY2 retracting bar B2. This latter action is accomplished in FIG. 14 by delay relays D2' and D2" which provide pulses for energizing the reverse controls of the flip-flop switches controlling fluid actuated cylinders CY1 and CY2 to retract a short time after B1 urges W against AB.

The scanning action is accomplished as follows. The pulse signal output of PHC is also passed through delay line D1 to respective time delay relays D3 and D4 and the complement input C of an electrical bi-stable unit or flip-flop switch FL2.

The pulse transmitted to switching control C of flip-flop switch FL2 switches the picture signal output of the video scanning device CAM over a circuit to the writing or recording input WI of a video storage tube STT. The image signal derived from scanning the surface of the prepositioned workpiece W is thus recorded on the storage element of the storage tube STT. The delay element D4 transmits a second pulse to C of FL2 a time delay period after transmission of said first pulse to effect the recording of the video picture signal on the storage element of STT. Thereafter FL2 switches to a condition whereby the circuit between the scanner and the storage tube STT is broken so that when the work member W starts moving again after B2 retracts, the recording in STT will have been effected. A delay relay D3 is provided with a time constant equal to that of D4 or greater to permit the picture signal to be read into the storage tube STT before effecting the recording of said picture signal on the magnetic recording member 10 in one of the manners hereinabove described or otherwise using said picture as described to effect a measurement or comparison by reproducing it simultaneously with signals generated by reproduction from member 10 in the manners provided in FIGS. 1 to 12. The output of D3 is passed to a flip-flop switching circuit FL2' which is a normally open switching means which, upon receipt of a pulse from delay relay D3 closes for a predetermined period of time after which it automatically opens. The input to switch FL2' is derived from reproduction amplifier A1. When the reproduction head PU1 reproduces the sync signal S1 from channel C1 of recording member 10, said S1 pulse is passed to read trigger control RT of storage means STT which triggers the read beam control of said video storage tube and causes said beam to sweep the surface of the storage element and produce an output therefrom which is a video picture signal. The output is passed to a recording amplifier RA2 and recorded on channel C2 through recording head RH2 in a fixed position relative to the signal S1 recorded on channel C1. The trigger control RT comprises a vacuum tube gate for changing, when actuated by the pulse from A1, the potential of the read gun element of STT the desired voltage to effect automatic reading of the stored signal. The circuit between A1 and RT remains closed for a period to permit 10 to travel at least one cycle so that regardless of where the recorded signal S1 is located when FL2' is first energized, the reproduction of signal S1 will pass through switch FL2' to RT before the switch opens. The output of FL2' is also passed to a time delay switch FL3 which is in the circuit of the recording amplifier RA2 and the recording head RH2 which maintains said circuit closed for a period of time necessary to effect recording on member 10 of at least one complete video frame picture signal. Thereafter FL3 opens disconnecting the circuit between RA2 and RH2.

It is noted that the picture signal passed through switch FL3 may be passed directly to a computing circuit without being recorded on the member 10. For example, in FIG. 3, the output FL3' may be connected to the gate G2, in the circuit of FIG. 4. It may be connected to the input of CL2. In FIG. 6 the output line FL3' may be connected to the output of A2, in FIG. 7 to the output of A2, in FIG. 8 to the input of CL2 and in FIG. 9 to the input of CL2. Recording on the member 10 has the advantage that said PB signal may be re-scanned if the need be, reproduced therefrom at any time after said recording or operated upon to effect a desired change in said signal or in part of said signal.

FIG. 15 is a schematic diagram showing a further means for producing a first positive pulse when the leading edge of an elongated signal or pulse appears in a circuit and a second pulse output when the trailing edge of said signal appears thereat. The circuit of FIG. 15 may be substituted for the Schmidt cathode coupled multivibrator circuit CM of FIGS. 8 and 9.

The circuit of FIG. 15 includes a differentiating circuit DCT comprising a capacitator and resistance of very small time constant, in the order of 10–12 microseconds. The input to the differentiating circuit is from the clipping circuit CL3 of FIG. 8 or 9. A summing amplifier or integrator SA is provided in the circuit with three inputs to its grid. One input to SA is derived directly from a crystal diode D1 of the differentiating circuit DCT. Another input to SA is from the output of a D.C. amplifier inverter IN. The notation D2 refers to a second crystal diode in the circuit of DCT and IN. A feedback loop is shown from the output of SA to its input. The circuit CM of FIG. 15 will provide a dual signal output, as described, when a prolonged signal passes to its input.

I claim:

1. Automatic scanning and control apparatus comprising in combination with an electron beam scanning apparatus including means for causing an electron beam to scan an area of an image field in a single frame sweep along a predetermined path in said field and to produce a video picture signal of said scanning on an output of said apparatus, an analyzing means for inspecting a predetermined area of said image field by the analysis of that portion of the picture signal generated during the scanning by said electron beam of said predetermined area of said image field, said analyzing means including an analyzing circuit connected to a gating means in the output of a circuit in which said picture signal is generated, a variable programming means for controlling said gating means whereby to prevent the passage of said picture signal to said analyzing circuit, said programming means being synchronized in its operation for automatically operating said gating means in predetermined time relation to the generation of said picture signal whereby to switch in a manner to pass to said analyzing circuit only that portion of said picture signal which is generated during the scanning of said predetermined area of said image field.

2. Automatic scanning and control apparatus in accordance with claim 1, said gating means having an electrically operative switching input, said means for automatically operating said gating means comprising a programming means which includes means for generating a plurality of gating signals adapted for switching said gating means, in predetermined time relation to each other, means for conducting said gating signals to the switching input of said gating means, means for synchronizing the operation of said programming means with the generation of said picture signal whereby only predetermined sections of the signal derived by scanning are passed through said gating means.

3. Automatic scanning and control apparatus in accordance with claim 1, including means for recording said picture signal on a magnetic recording medium and for recording a plurality of gating signals on said medium in predetermined positions relative to said picture signal, a transducing means for reproducing said picture signal from said magnetic recording medium, a transducing means for reproducing said gating signals therefrom, the output of said picture signal reproduction transducing means being connected to the input of said gating means, the output of the gating signal reproduction transducing means being operatively connected to a switching input of said gating means, said analyzing circuit being operatively connected to the output of said gating means, the reproductions of said gating signals adapted to effect the operation of said gating means whereby to pass only a predetermined length of said picture signal through said gating means to said analyzing circuit.

4. Automatic scanning apparatus in accordance with claim 1, said analyzing means comprising a video signal clipping means in the signal output of said apparatus which is provided at a predetermined clipping level whereby it will pass only those portions of the picture signal which are beyond the range of said clipping level to a further computing means.

5. Automatic scanning apparatus in accordance with claim 4, said further computing means comprising in combination, a magnetic recording medium having a gating signal recorded in a predetermined position thereon, means for moving said magnetic recording medium at substantially constant speed past a transducing means for reproducing said gating signal therefrom, means for synchronizing the movement of said recording medium to effect the reproduction of said gating signal therefrom at a predetermined time relative to the production of said picture signal whereby to effect the reproduction of said gating signal during an interval of time a predetermined length of said picture signal is present at said gating means, said gating means adapted to be energized by said gating signal to effect the passage therethrough of a predetermined portion of said picture signal to said clipping means to the exclusion of other portions of said signal.

6. Automatic scanning apparatus in accordance with claim 1, said analyzing circuit comprising in combination:
(a) a comparator signal generating means synchronized in operation to the generation of said picture signal and adapted to generate a comparator signal at the same time a predetermined length of said picture signal is present at said analyzing circuit, and
(b) a comparator means operatively connected to said comparator signal generating means and picture signal generating means for indicating variations between said predetermined length of said picture signal and said comparator signal.

7. Automatic scanning apparatus in accordance with claim 6, said comparator means comprising a video clipping means operatively connected to the circuit on which said gated video signal is generated and adapted to provide on its output only those portions of the video signal gated thereto having an amplitude beyond a predetermined level, and means for indicating when the comparator signal and a signal passed by said clipping means occur simultaneously.

8. Automatic scanning apparatus in accordance with claim 7, said means for indicating when said comparator signal and the output of said clipping means occur simultaneously comprising a logical AND circuit having inputs from said clipping means and said comparator signal generating means, an output from said AND circuit being indicative that the two inputs are each energized with a signal.

9. Apparatus in accordance with claim 8, which includes means for automatically indicating when the signal clipped by said clipping means does not appear at its input to said AND circuit at the same time said comparator signal is present thereat which indicates that a predetermined area of the image field being scanned is not in a predetermined position therein.

10. Apparatus in accordance with claim 9, which includes means for automatically determining and indicating the degree a predetermined area of said image field is offset from a predetermined position in the field being scanned.

11. Apparatus in accordance with claim 10, said means for automatically indicating the degree a predetermined area of said image field is offset from a predetermined position in the image field being scanned comprising an automatic counting means adapted to become energized if one of said signals is present at said AND circuit and adapted to continue to operate until the other signal is present thereat, said automatic counting means adapted to indicate by means of a signal on an output thereof the time interval between the appearance of the two signals at the AND circuit which is proportional to the degree said predetermined area of said image field varies from a predetermined position which is indicated by said comparator signal.

12. Video scanning apparatus comprising in combination:
(a) a video beam scanner including means for controlling a video beam to scan an image field in a predetermined pattern which comprises a plurality of closely spaced substantially parallel scanning links,
(b) said video scanner adapted to produce a picture signal in scanning an image field,
(c) means for generating said picture signal on a first output circuit of said apparatus,
(d) said first output circuit being connected to the input of an electrical gating means,
(e) means for programming said gating means to operate in synchronization with the generation of said picture signal at its input to pass through said gating means only those portions of said picture signal which were generated during the beam movement across a predetermined area of the image field scanned by said scanning means, and
(f) means for automatically analyzing the resulting signals passed through said gating means.

13. Automatic scanning apparatus comprising in combination:
(a) an electron beam scanning apparatus having means for causing an electron beam to scan an area of an image field and to produce a video picture signal of said scanning on an output of said apparatus.
(b) means for analyzing a predetermined area of said image field by the analysis of that portion of the picture signal generated during the scanning by said electron beam of said predetermined area of said image field,
(c) said analyzing means comprising a comparator signal generating means which is synchronized in its operation to the generation of said picture signal whereby to generate a comparator signal of predetermined characteristic,
(d) said comparator signal generating means comprising a magnetic recording means having said comparator signal recorded on a predetermined area thereof,
(e) means for reproducing said comparator signal from said magnetic recording means for its synchronized and controlled movement relative to a transducing means,
(f) means for operating said magnetic recording means whereby to effect the reproduction of said comparator signal therefrom during the reproduction of a predetermined length of the picture signal derived by scanning said predetermined area of said image field,
(g) an analyzing means in the output of said means for reproducing said comparator signal and the circuit on which said video picture signal is generated adapted for comparing the characteristics of the two signals transmitted thereto and for indicating by means of a further signal differences between said two signals.

14. Automatic scanning apparatus in accordance with claim 13, said comparator signal generating means comprising a magnetic recorder and reproducer having a magnetic recording member having said comparator signal recorded on a predetermined area thereof, said magnetic recording member adapted to be driven at constant speed relative to a reproduction transducer, means for synchronizing the movement of said magnetic recording member relative to said transducer whereby said comparator signal is reproduced therefrom during the interval a predetermined length of said picture signal is present at said analyzing means, said predetermined length of said picture signal being that generated by said electron beam in movement between predetermined coordinates in said image field, the path scanned by said electron beam between said coordinates adapted to normally vary in light intensity in a manner to cause a change in the characteristic of said picture signal, said analyzing means including means for automatically indicating said change in said picture signal by means of a further signal.

15. Automatic scanning apparatus in accordance with claim 14, said analyzing means including a switching AND circuit or the like, said picture signal adapted to be passed to a video clipping means, the field being scanned by said electron beam having a predetermined image area therein of different light intensity than the adjacent image field and which may vary from a predetermined position in said field, said analyzing means including means for indicating the variance of said image area from said predetermined position in the field being scanned, the indicating means including said video clipping means which is adjusted in clipping levels to pass a signal therefrom only when scanning said predetermined image area while blocking that portion of the picture signal adjacent said image area, means for synchronizing the operation of said magnetic recording member with the movement of said scanning beam whereby to generate said comparator signal when said beam scans predetermined coordinates in said field, said predetermined position of said predetermined image area being between said predetermined coordinates, and means for passing said comparator signal and the signal generated at the output of said clipping means to said AND circuit which is adapted to provide an output when both of said signals are simultaneously present thereat, thereby indicating when said predetermined area of said image field is between said predetermined coordinates, and means for indicating when said signals are not generated at the inputs to said AND circuit.

16. Apparatus in accordance with claim 15, including means for indicating the degree said predetermined area varies from said predetermined position in said image field by the measurement of the difference in time said two signals appear at said analyzing circuit.

17. An automatic scanning and measuring apparatus for determining the measurements of a predetermined segment of an image field being scanned, said apparatus comprising a beam device for selectively scanning said image field and producing a picture signal of said scanning, said beam device including means for producing a first signal when said beam device commences scanning said predetermined segment and a second signal when said beam device completes scanning said predetermined segment, timing means coupled to said device and adapted to be energized and deenergized respectively by said first and second signals whereby the output of said timing means indicates the time elapsed during the interval that said beam device is scanning said predetermined segment, and integrating means coupled to said timing means for determining from the output thereof the distance travelled by said beam device while scanning said predetermined segment.

References Cited in the file of this patent

UNITED STATES PATENTS

| | | |
|---|---|---|
| 2,517,808 | Sziklia | Aug. 8, 1950 |
| 2,533,326 | Putt | Dec. 12, 1950 |
| 2,545,957 | Kell | Mar. 20, 1951 |
| 2,561,197 | Goldsmith | July 17, 1951 |
| 2,565,103 | Toulon | Aug. 21, 1951 |
| 2,648,723 | Goldsmith | Aug. 11, 1953 |
| 2,674,915 | Anderson | Apr. 13, 1954 |
| 2,674,917 | Summerhayes | Apr. 13, 1954 |
| 2,698,875 | Greenwood | Jan. 4, 1955 |
| 2,731,620 | Gottfried | Jan. 17, 1956 |
| 2,803,406 | Nuttall | Aug. 20, 1957 |
| 2,803,755 | Milford | Aug. 20, 1957 |